United States Patent [19]
Namizuka et al.

[11] Patent Number: 5,892,852
[45] Date of Patent: *Apr. 6, 1999

[54] IMAGE PROCESSING APPARATUS

[75] Inventors: Yoshiyuki Namizuka, Sagamihara; Kouichi Kamon, Yokohama; Masaaki Ito, Zama; Hiroyuki Kawamoto, Kawasaki; AnQi Ye, Tokyo; Takeharu Tone, Yokohama, all of Japan

[73] Assignee: Ricoh Co., Ltd, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 834,849

[22] Filed: Apr. 10, 1997

Related U.S. Application Data

[63] Continuation of Ser. No. 399,593, Mar. 7, 1995, abandoned.

[30] Foreign Application Priority Data

Mar. 8, 1994 [JP] Japan ................................... 6-037355
Apr. 25, 1994 [JP] Japan ................................... 6-086131
Feb. 8, 1995 [JP] Japan ................................... 7-020522

[51] Int. Cl.$^6$ ..................................................... H04N 1/40
[52] U.S. Cl. ......................... 382/254; 382/266; 382/205; 382/260; 358/447; 358/453; 358/456
[58] Field of Search ..................................... 358/447, 455, 358/456, 443, 457, 458, 462, 464, 454, 453, 450; 382/182, 187, 186, 199, 205, 254, 266, 273, 274, 260, 263, 264

[56] References Cited

U.S. PATENT DOCUMENTS

| | | | |
|---|---|---|---|
| 5,001,576 | 3/1991 | Tanaka et al. | 358/447 |
| 5,051,844 | 9/1991 | Sullivan | 358/443 |
| 5,166,810 | 11/1992 | Sorimachi | 358/462 |
| 5,231,677 | 7/1993 | Mita et al. | 358/447 |
| 5,321,523 | 6/1994 | Hashimoto | 358/455 |
| 5,379,130 | 1/1995 | Wang et al. | 358/456 |
| 5,459,587 | 10/1995 | Fukushima | 358/456 |
| 5,473,444 | 12/1995 | Sakamo et al. | 358/455 |
| 5,515,180 | 5/1996 | Maeda | 358/455 |

*Primary Examiner*—Edward L. Coles
*Assistant Examiner*—Cheukfan Lee
*Attorney, Agent, or Firm*—Oblon, Spivak, McClelland, Maier & Neustadt, P.C.

[57] ABSTRACT

An image processing apparatus includes a converter for reading out a manuscript image signal and converting the read-out signal to an electric signal. A signal processor executes signal processing for the electric signal, and an image generator generates an image in accordance with the processed signal. An outputting unit separates a character area and a photograph area of the manuscript from the read-out signal and outputs an area signal. A changing-over circuit changes over a filtering process in accordance with the area signal. A halftone processor executes in parallel a halftone process for the character area image and a halftone process for the photograph area image, and the changing-over circuit selectively changes over the halftone processing result for the character and the halftone processing result in accordance with the area signal.

12 Claims, 25 Drawing Sheets

PIXEL NUMBER: N=13
THRESHOLD VALUE: T=32

SMTF[3:0]=0
(RATE OF MAGNIFICATION/
REDUCTION FOR 25%~64%)    1/8

FIG. 16A

SMTF[3:0]=1
(RATE OF MAGNIFICATION/
REDUCTION FOR 65%~154%)   1/11

FIG. 16B

SMTF[3:0]=2
(RATE OF MAGNIFICATION/
REDUCTION FOR 155%~256%)  1/11

FIG. 16C

SMTF[3:0]=3
(RATE OF MAGNIFICATION/
REDUCTION FOR 257%~400%)  1/8

FIG. 16D

SMTF[3:0]=4
(RATE OF MAGNIFICATION/
REDUCTION FOR 65%~154%)   1/8

FIG. 16E

| 1 | 2 | 2 | 2 | 1 |
|---|---|---|---|---|
| 1 | 4 | 4 | 4 | 1 |
| 2 | 4 | 8 | 4 | 2 |
| 1 | 4 | 4 | 4 | 1 |
| 1 | 2 | 2 | 2 | 1 |

SSMT[3:0]=0  1/64

FIG. 17A

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

SSMT[3:0]=1  1/1

FIG. 17B

| 1 | -2 | -6 | -2 | 1 |
|---|---|---|---|---|
| -2 | 4 | 12 | 4 | -2 |
| -6 | 12 | 36 | 12 | -6 |
| -2 | 4 | 12 | 12 | -6 |
| 1 | -2 | -6 | -2 | 1 |

SSMT[3:0]=2  1/64

FIG. 17C

| 1 | -1 | -4 | -1 | 1 |
|---|---|---|---|---|
| -1 | 4 | 10 | 4 | -1 |
| -4 | 10 | 28 | 10 | -4 |
| -1 | 4 | 10 | 4 | -1 |
| 1 | -1 | -4 | -1 | 1 |

SSMT[3:0]=3  1/64

FIG. 17D

| 1 | 0 | -2 | 0 | 1 |
|---|---|---|---|---|
| 0 | 4 | 8 | 4 | 0 |
| -2 | 8 | 20 | 8 | -2 |
| 0 | 4 | 8 | 4 | 0 |
| 1 | 0 | -2 | 0 | 1 |

SSMT[3:0]=4  1/64

FIG. 17E

| -1 | 0 | 2 | 0 | -1 |
|---|---|---|---|---|
| 0 | -3 | 2 | -3 | 0 |
| 2 | 2 | 16 | 2 | 2 |
| 0 | -3 | 2 | -3 | 0 |
| -1 | 0 | 2 | 0 | -1 |

SSMT[3:0]=5  1/16

FIG. 17F

| 0 | 0 | 0 | 0 | 0 |
|---|---|---|---|---|
| -1 | 2 | 6 | 2 | -1 |
| -6 | 12 | 36 | 12 | -6 |
| -1 | 2 | 6 | 2 | -1 |
| 0 | 0 | 0 | 0 | 0 |

SSMT[3:0]=6  1/64
(RATE OF MAGNIFICATION/
REDUCTION FOR 64% OR LESS)

FIG. 17G

| -2 | 4 | 8 | 4 | -2 |
|---|---|---|---|---|
| 0 | 0 | 0 | 0 | 0 |
| -4 | 8 | 32 | 8 | -4 |
| 0 | 0 | 0 | 0 | 0 |
| -2 | 4 | 8 | 4 | -2 |

SSMT[3:0]=7  1/64
(RATE OF MAGNIFICATION/
REDUCTION FOR 155% OR MORE)

FIG. 17H

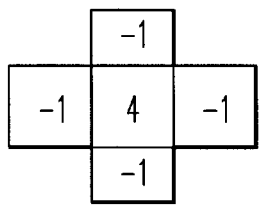
FIG. 18
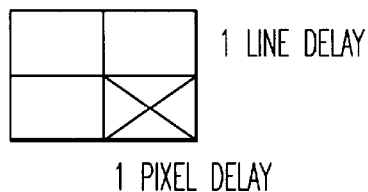
FIG. 19
| 1  | 2  | 3  | 4  | 5  |
|----|----|----|----|----|
| 6  | 7  | 8  | 9  | 10 |
| 11 | 12 | 13 | 14 | 15 |
| 16 | 17 | 18 | 19 | 20 |
| 21 | 22 | 23 | 24 | 25 |
( 1 & 2 & 3 & 4 & 5 & 6 & 7 & 8 & 9 & 10 ) | |
( 6 & 7 & 8 & 9 & 10 & 11 & 12 & 13 & 14 & 15 ) | |
( 11 & 12 & 13 & 14 & 15 & 16 & 17 & 18 & 19 & 20 ) | |
( 16 & 17 & 18 & 19 & 20 & 21 & 22 & 23 & 24 & 25 ) | |
( 1 & 6 & 11 & 16 & 21 & 2 & 7 & 12 & 17 & 22 ) | |
( 3 & 8 & 13 & 18 & 23 & 4 & 9 & 14 & 19 & 24 ) | |
( 4 & 9 & 14 & 19 & 24 & 5 & 10 & 15 & 20 & 25 )
FIG. 20

4X1 (P) ··· 1 BLOCK,
EXPANSION WITH 1X3 BLOCKS

1 BLOCK IS 4X1 (P)

FIG. 26A

1 DOT PROCESSING

| BEFORE CONVERSION | OUTPUT |
|---|---|
| 0000b | 00h |
| 0001b | 11h |
| 0010b | 33h |
| 0011b | 55h |
| 0100b | 77h |
| 0101b | 99h |
| 0110b | BBh |
| 0111b | DDh |
| 1000b | FFh |

FIG. 26B

2 DOTS PROCESSING

| BEFORE CONVERSION | OUTPUT |
|---|---|
| 00000b | 00h |
| 00001b | 08h |
| 00010b | 11h |
| 00011b | 22h |
| 00100b | 33h |
| 00101b | 44h |
| 00110b | 55h |
| 00111b | 66h |
| 01000b | 77h |
| 01001b | 88h |
| 01010b | 99h |
| 01011b | AAh |
| 01100b | BBh |
| 01101b | CCh |
| 01110b | DDh |
| 01111b | EEh |
| 10000b | FFh |

IN THE CASE OF "4X4"

1 DOT IS DIVIDED INTO 15(16 VALUES) IN THE DIRECTION OF THE MAIN SCANNING.
THE ENTIRE MATRIX REALIZES 241 HALFTONES.
15X4X4+1=241 (HALFTONES)

IN THE CASE OF "6X6"

1 DOT IS DIVIDED INTO 8(9 VALUES) IN THE DIRECTION OF THE MAIN SCANNING.
THE ENTIRE MATRIX REALIZES 289 HALFTONES.
8X6X6+1=289 (HALFTONES)

IN THE CASE OF "4X4"

(ORDER FROM THE SMALLEST TO THE LARGEST OF "THRESHOLD VALUE")

| 1 | 2 | 3 | 4 | 5 | 6 | 7 | 8 | 9 | 10 | 11 | 12 | 13 | 14 | 15 | (LEFT-SHIFT PULSE) |
| 15 | 14 | 13 | 12 | 11 | 10 | 9 | 8 | 7 | 6 | 5 | 4 | 3 | 2 | 1 | (RIGHT-SHIFT PULSE) |
| 15 | 13 | 11 | 9 | 7 | 5 | 3 | 1 | 2 | 4 | 6 | 8 | 10 | 12 | 14 | (CENTRAL PULSE) |

*FIG. 28A*

IN THE CASE OF "6X6"

| 1 | 2 | 3 | 4 | 5 | 6 | 7 | 8 | (LEFT-SHIFT PULSE) |
| 8 | 7 | 6 | 5 | 4 | 3 | 2 | 1 | (RIGHT-SHIFT PULSE) |
| 8 | 6 | 4 | 2 | 1 | 3 | 5 | 7 | (CENTRAL PULSE) |

*FIG. 28B*

(1) THIN LINE CONVERSION

AFTER PROCESSING THE IMAGE QUALITY, THIN LINE OR THICK LINE CONVERSION IS PERFORMED IN THE DIRECTION OF THE MAIN SCANNING FOR THE DATA CONVERTED TO THE WRITTEN-IN PULSE CODE.

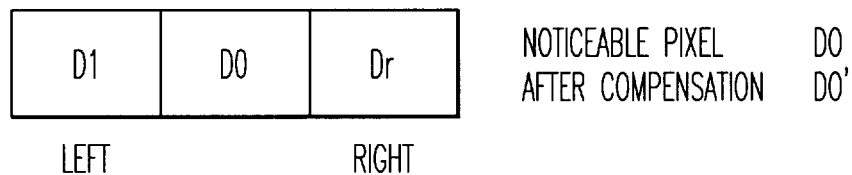

NOTICEABLE PIXEL    D0
AFTER COMPENSATION  D0'

(2) THIN LINE CONVERSION LEVEL 2 (gen=2)

WHEN THE INEQUALITIES SHOWN BELOW COME INTO EXISTENCE,
$Dl \geq 192$ AND $Dr < 60$, OR $Dl < 60$ AND $Dr \geq 192$, $D0' = 0.5 \times D0$.

*FIG. 29*

IMAGE PROCESSING APPARATUS

This application is a continuation of application Ser. No. 08/399,593, filed on Mar. 7, 1995, now abandoned.

BACKGROUND OF THE INVENTION

1. Field of the Invention

The present invention relates to an image processing apparatus in which a character portion of an image represented by inputted image data has an improved resolution and a picture portion thereof has an improved halftone characteristic.

2. Discussion of the Background

On almost all occasions, only one of either a resolution of an image or a halftone characteristic of an image is improved in conventional image processing apparatus. However, in a case that a character portion and a picture portion mixedly exist in the image, the image quality of either one of both areas is sacrificed (deteriorated).

Furthermore, in a method of performing image area separation, the construction of the image processing apparatus becomes rather complicated and manufacturing costs thereof turn out to be high-cost.

Japanese Laid-open Patent Publication No. 01-52 137378/1989 proposes an image processing system which separates a character image and a photograph image both on a manuscript document, executes separately a filtering treatment to the respective images, performs individually different binarizing processes respectively fitted to the characteristics of the character image and the photograph image, and thereby obtains image data representing clearly both of the character image and the photograph image, respectively.

On the other hand, Japanese Laid-Open Patent Publication No. 02-34233/1990 proposes a detection system for detecting a net-points area in order to separate the character area and the photograph area on a manuscript document.

In such a situation, it is required to provide an image forming apparatus capable of reproducing the resolution and halftone characteristics fitted to the area by use of a low-cost method.

In accordance with the type and the quality of the manuscript document, the image processing functions required to the copying machine differ from each other. In recent years, a copying quality which satisfies the requirements for all items employed as the manuscript document to be copied has been required. At present, there are proposed various types of image processing systems capable of covering almost all of the general manuscript documents. The words of "almost all of the documents" signify primarily manuscript documents constructed with a mixture of character, photograph, etc. just like a magazine or the like, including other documents such as newspapers, documents processed by a word processor, hand-written documents, and so on. In particular, there have been proposed various types of systems capable of covering almost all of the general manuscript documents by aiming at the employment of both of the character and the photograph.

one example of those proposals is described in the specification of the afore-mentioned Japanese Laid-Open Patent Publication No. 01-137378/1989.

However, in the conventional digital copying machine, a copy mode for the character image turns out to be the primary mode (the initial state being in this mode) from the viewpoint that almost all of the manuscripts are character documents. And further, when an operator performs a key operation, the operation of the copying machine can be changed to the mode for the manuscript document in the state of the character-and-photograph mixture image, or to the mode for the photograph image only. The above matters may be due to the idea that the character manuscript is the first leading (primary) part of the general manuscript, and due to the troublesome facts that the treatment of employing both of the character and the photograph is incomplete, a mistake of processing the image area separation occurs, and further, a faint character manuscript cannot be reproduced clearly.

Conventionally, in the digital image processing, there existed two types of image processings; those are, a first processing of putting an emphasis on a resolution for processing a character image, line image, etc., and another processing of putting an emphasis on a halftone for processing a photograph image or other halftone-based image. On this occasion, the characteristics of the image processing method in the former case completely differ from that in the latter case. Therefore, it is necessary to prepare separately an image processing mode for a character or line image and another image processing mode, on many occasions. On the other hand, a character/photograph compatibility mode may discriminate the characteristics of the prepared two image processing modes from the information on the manuscript document and exert preferable treatment, respectively, on both of the above-mentioned modes, on some other occasions.

Regarding the character/photograph areas separation processing method and the character/photograph compatibility processing method, many methods have been proposed in recent years. However, in the former case, it is difficult to completely separate the image area. And further, in the latter case, when both of the character image and the photograph image are processed with the compatibility, the character image quality in the case of specially processing the character image does not turn out to be equal to the photograph image quality in the case of specially processing the photograph image. Therefore, it is a limited improvement method to propose still another mode as the third mode following the first mode specialized in the character image and the second mode specialized in the photograph image.

Furthermore, the object of executing the treatment of separating both of the image areas is to intend to realize the compatibility by preventing the phenomenon of "moire" from occurring for the third mode of the net-points manuscript document on some occasions, contrary to the above-mentioned standpoint of putting the emphasis on the resolution in the case of processing the character image and putting the emphasis on the halftone in the case of processing the photograph image.

SUMMARY OF THE INVENTION

Accordingly, one object: of the present invention is to provide a novel image processing apparatus capable of reproducing both a resolution and a halftone, respectively, suitable for a character image and a photograph image, by use of a simple structure and a low-cost method.

Regarding manuscript documents recently employed in the office, a proportion of mixed manuscripts in which a photograph area is contained in a character area has sharply increased in recent years. It has been an appointed task (function) of the copying machine to faithfully reproduce such manuscript images as mentioned above. However, although the halftone of the photograph is reproduced faithfully, a faint manuscript, such as a pencil-written faint manuscript, is reproduced faintly as in the state of the original manuscript. This does not satisfy the requirement of the user on some occasions. The user often requires a dark copy even in the case of a faint original manuscript.

And further, in the office, paper sheets discharged from the copying machine become a next manuscript document and other paper sheets discharged from the copying machine become still a next manuscript document. In such a manner, on many occasions, copied documents are made in order during plural generations. On this occasion, the line of the copying output due to the property of the electrophotography gradually becomes thick. The copying quality deteriorates each time the generation proceeds. This is one of the problems to be solved by the present invention.

According to the present invention, instead of a character manuscript mode, a character/photograph mixing mode, and a photograph mode as required for conventional copying machines, the following classification of modes is required:

1) a mode for covering almost all modes such as a character/photograph mixing mode, a sole character mode (excluding the special one), a sole photograph mode (excluding the special example), and another mode;

2) a mode for processing the image of a photograph, in particular, a specialized photograph image, on an entire surface;

3) a mode for processing a faint manuscript of a character of low contrast, in particular, such as a pencil manuscript; and 4) a mode for processing a manuscript of a character to be copied for a long time (during several generations).

In the conventional copying machine, although the machine had the mode of processing both of the character and the photograph, the copied document of the character/photograph mode could not be obtained by operating the key on the operation panel, so long as the mode of processing both of the character and photograph was not selected.

Conventionally, the three statuses of the mode for the character manuscript mode, the photograph manuscript mode, and the character/photograph mixing mode have been offered to the user. However, in practice, the copy required has turned out to be multiformed.

It is a further object of the present invention to provide an image processing apparatus capable of reproducing both a resolution and a halftone suitable for various types of image areas on a manuscript document.

It is another object of the present invention to obtain preferable images by a one-time copying operation for a mixed manuscript having a character/line image and a photograph/net points image.

It is still another object of the present invention to eliminate an error of an area separation such as the area discrimination of a photograph area and a character area.

It is still another object of the present invention, to state more concretely, to provide a digital copying machine to be able to respond to a general manuscript including a mixed image of a character and a photograph in a state immediately after returning to an initial state by the action of a reset function performed at a time of switching on the copying machine, or performed a constant time period after the copying operation finishes.

is still another object of the present invention to satisfy the multiformed needs.

It is still another object of the present invention to provide a processing mode specialized in a manuscript of low contrast.

It is still another object of the present invention to avoid a deterioration of an image quality such as an image becoming thinner or thicker caused by repeating the copying operation.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 16a through 16e are plan views showing coefficient distributions of a filter employed for compensation performed in an MTF compensator block shown in FIG. 12;

FIGS. 17a through 17h are plan views showing coefficient distributions of a filter employed for a smoothing process performed in a smoothing processor block shown in FIG. 12;

FIG. 18 is a plan view showing a coefficient distribution of a filter employed for a filtering process in a 3×3 Laplacian block shown in FIG. 12;

FIG. 19 is a plan view showing a relationship between expansion processing four pixels and one extracted (taken out) pixel marked with "x" in an edge block shown in FIG. 12;

FIG. 20 is a plan view showing an area to be processed for a white candidate detection in a white background separating block shown in FIG. 12;

FIGS. 26a and 26b are plan views showing the relationship between γ-compensation data (before conversion) and output halftone data at a time of dividing the halftone of the data after performing the γ-compensation for the error diffusing process in the halftone processing circuit 119 shown in FIG. 23;

FIG. 28 is a plan view showing a distribution of a threshold value for the multi-values dither processing in the halftone processing circuit 119 shown in FIG. 23;

FIG. 29 is a plan view showing an algorithm for executing a thin-line processing to the data after performing the halftone processing at a copying mode in the halftone processing circuit 119 shown in FIG. 23.

DESCRIPTION OF THE PREFERRED EMBODIMENTS

Figure 1:
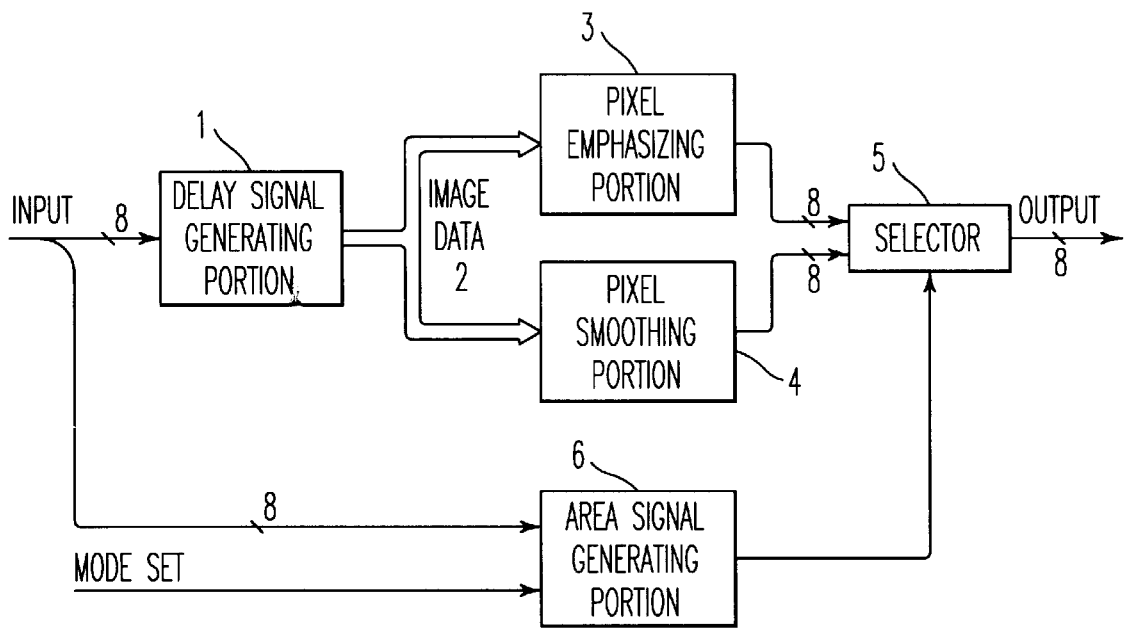
FIG. 1 is a block diagram showing an outlined construction of an embodiment of the present invention.

Referring now to the drawings where like reference numerals designate identical elements, and more particularly to FIG. 1, there are shown elements of an embodiment of the present invention. Input image data is processed into specified two-dimensional arrays in a delay signal generating portion 1 and is sent to a pixel emphasizing portion 3 for generating emphasized pixels and a pixel smoothing portion 4 for generating smoothed pixels. The image data processed by the pixel emphasizing portion 3 and the image data processed by the pixel smoothing portion 4 are sent to a selector (an output image selecting portion) 5. The selector 5 selects the image data supplied from the pixel emphasizing portion 3 or the image data supplied from the pixel smoothing portion 4 in response to a changeover signal supplied by an area signal generating portion 6, and outputs the selected image data.

Figure 2:
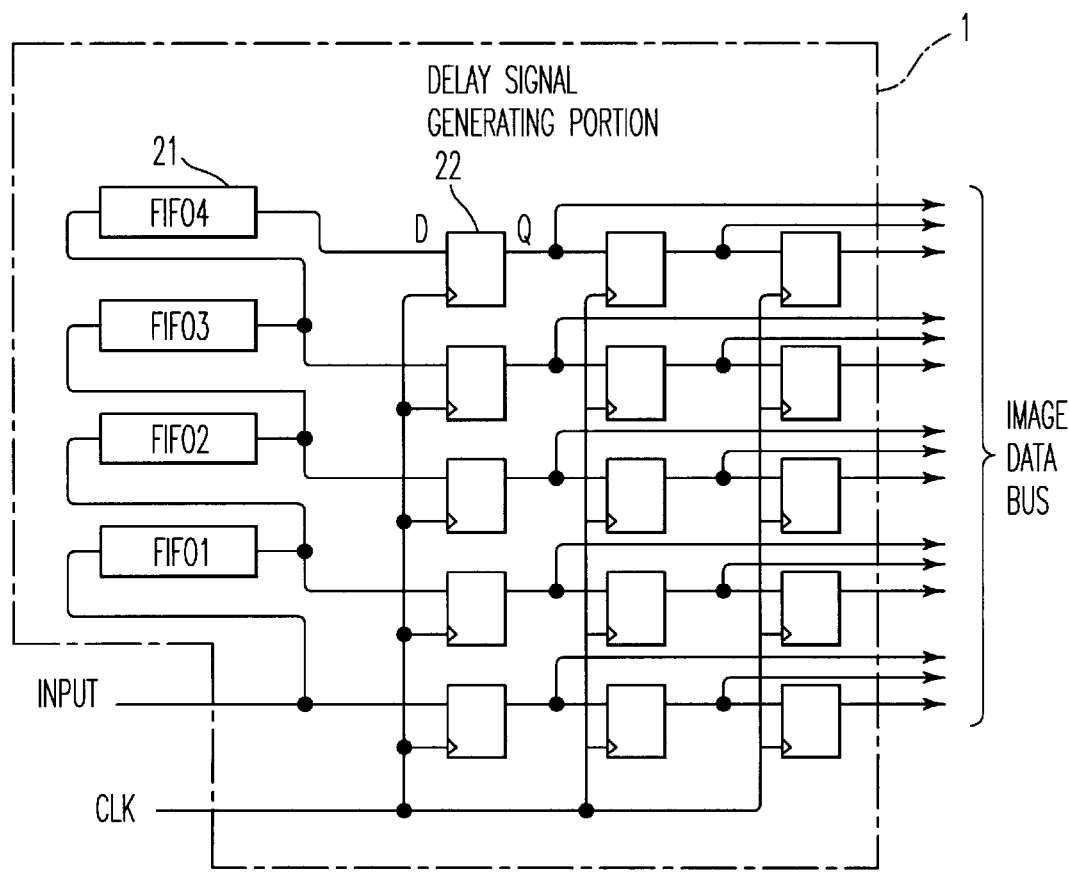
FIG. 2 is a block diagram showing a construction of a delay signal generating portion 1 shown in FIG. 1.

A configuration of the delay signal generating portion 1 is shown in FIG. 2. The delay signal generating portion 1 comprises a FIFO memory 21 (a shift register such as a RAM which first outputs the image data first entered) and flip-flop circuits 22. A delay signal of a sub-scanning direction is generated by the FIFO memory 21 and a delay signal of a main scanning direction is generated by the flip-flop circuits 22. Thus, image data groups of the sub-scanning direction and the main scanning direction are processed into plane area arrays, including noticeable pixels (pixels to be processed) as main data, and the image data composed of a plurality of pixels is simultaneously outputted (in parallel).

Figure 3:
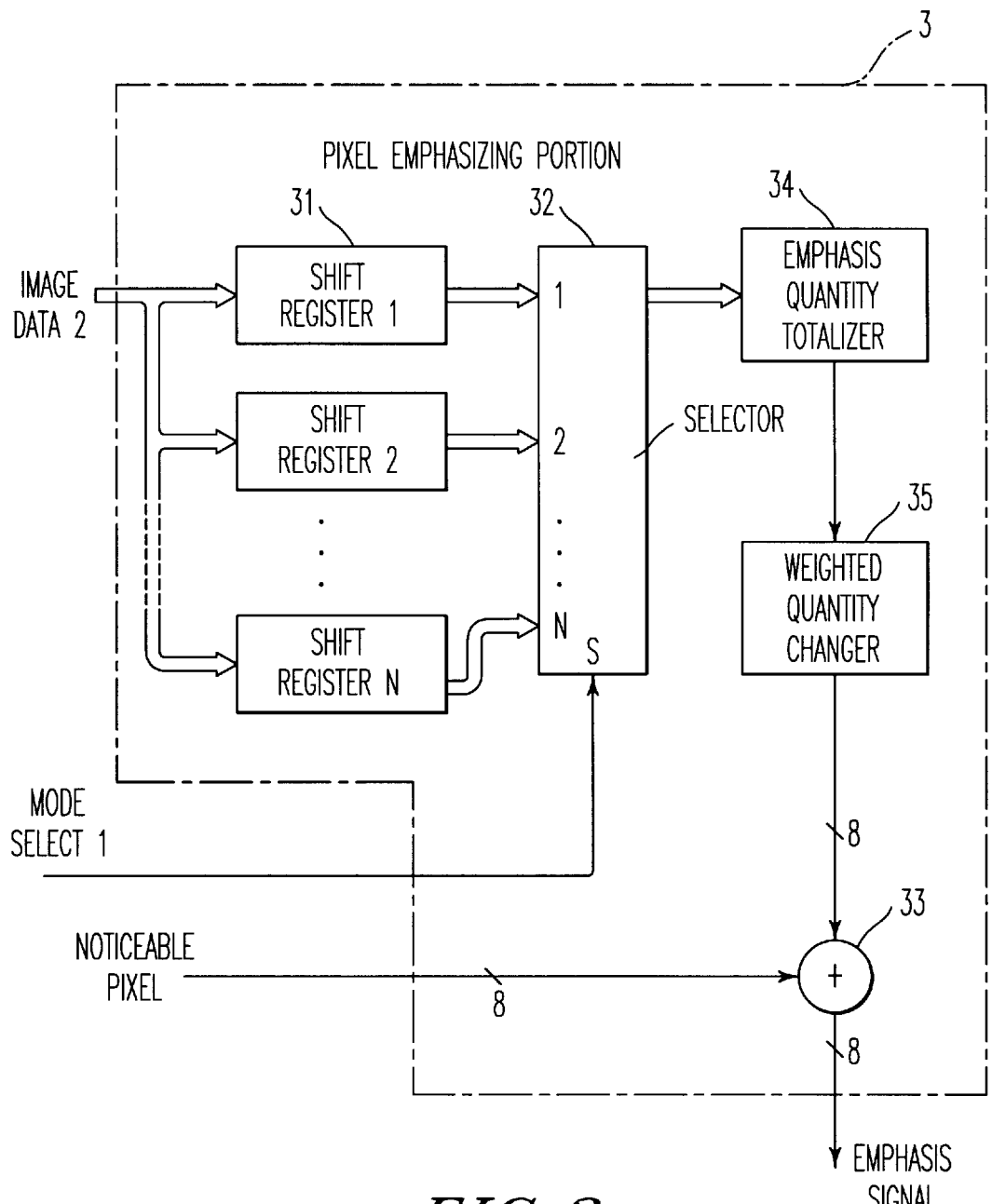
FIG. 3 is a block diagram showing a construction of a pixel (image) emphasizing portion 3 shown in FIG. 1.

An internal configuration of the pixel emphasizing portion 3 is shown in FIG. 3. The pixel emphasizing portion 3 incorporates a shifter 31, a selector 32 and an adder 33. Emphasis of pixels is carried out by shifting those bits corresponding to filter coefficient groups for image data generated in the delay signal generating portion 1. Several kinds of coefficient groups are prepared in advance and a coefficient group having a characteristic to be designated by a mode select 1 is selected in selector 32. A total sum of pixels of an emphasis component is obtained in emphasis quantity totalizer 34, and further a weighting changeover signal in accordance with an emphasis quantity required is generated by shifting the bits of the total sum signal in weighted quantity changer 35. A new generated emphasis component is added to the noticeable pixel, that is, a center pixel of a two-dimensional matrix generated due to the delay, and an emphasis signal is generated. The weight coefficients are symmetrical in reference to a central position, and therefore only the number of pixels up to the central position are required for the delay quantity in the main scanning direction in the delay signal generating portion 1 and the construction of the delay signal generating portion 1 is simplified.

Figure 4:
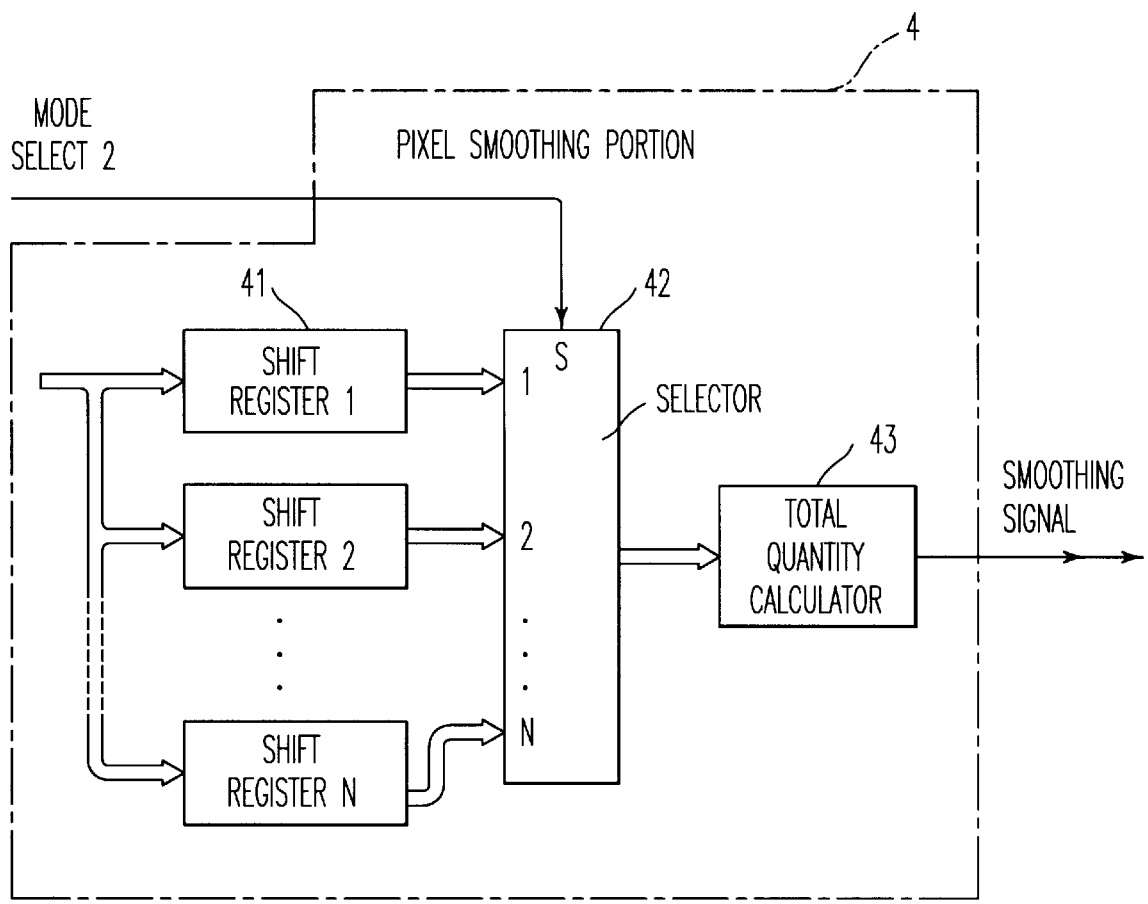
FIG. 4 is a block diagram showing a construction of a pixel (image) smoothing portion 4 shown in FIG. 1.

An internal configuration of the pixel smoothing portion is shown in FIG. 4. A shifting quantity of bits having a characteristic designated in the mode select 2 is selected in selector 42 for the image data generated with a delay, that is, the image data outputted by the delay signal generating portion 1, and the image data in which the noticeable pixels are smoothed is generated by calculating the total sum of the noticeable pixels and peripheral pixels. The weight coefficients are symmetrical in reference to a central position, and therefore only the number of pixels up to the central position is required for the delay quantity in the main scanning direction in the delay signal generating portion 1 and the construction of the delay signal generating portion 1 is simplified.

Figure 5:
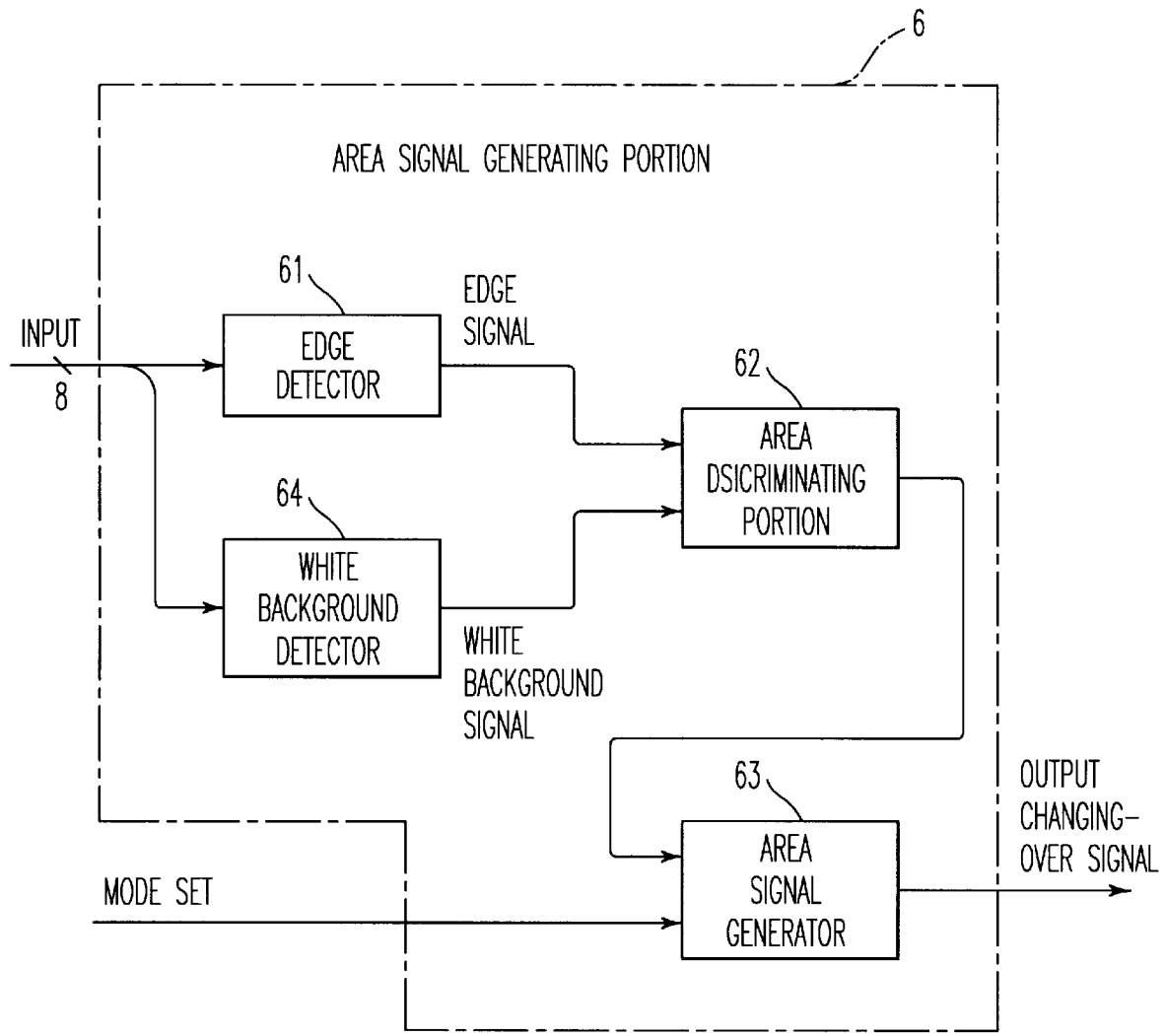
FIG. 5 is a block diagram showing a construction of an area signal generating portion 6 shown in FIG. 1 and which generates the area signal by detecting an edge and a white background at a text mode.

A configuration of an area signal generating portion 6 for generating an area signal from an edge signal and a white background signal when a text mode is set is shown in FIG. 5. For generation of the area signal from the edge signal and the white background signal on the image, the edge signal is detected by a Laplacian and binary processing in edge detector 61. For detecting the white background signal, a white background candidate is calculated by the emphasis signal based on a Laplacian and binary processing in white background detector 64 and, if there is a white background in a wide range of area for main scanning and vertical scanning, noticeable positions are regarded as the white background. A character area is discriminated according to an AND condition for the white background signal and the edge signal in area discriminator 62, and a discriminating condition is outputted only for area separation processing by the mode set from area signal generator 63. For full-surface emphasizing or full-surface smoothing without separation processing by the mode set, a changeover signal to be outputted is fixed to the area signal to be designated.

Figure 6:
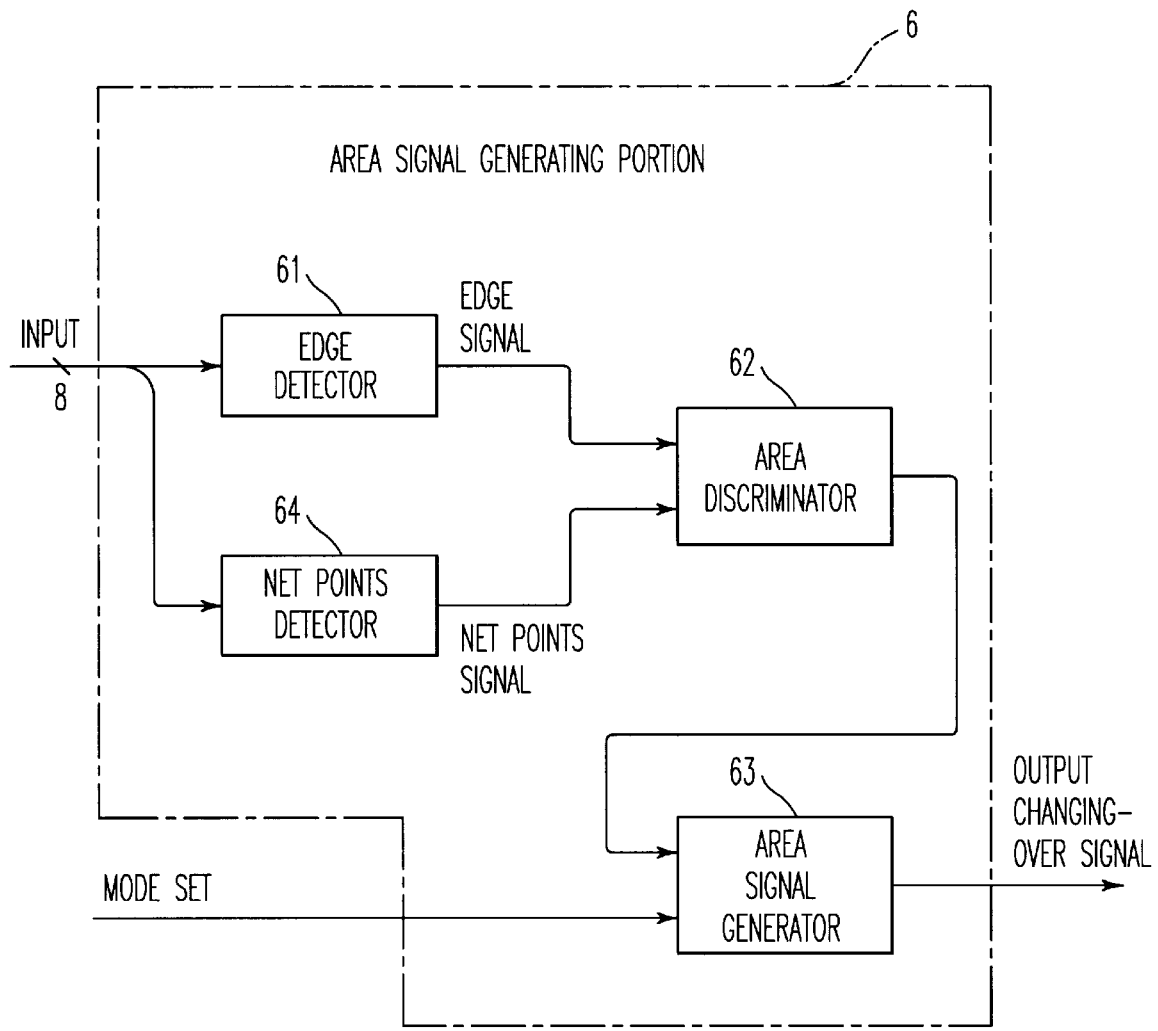
FIG. 6 is a block diagram showing a construction of the area signal generating portion 6 shown in FIG. 1 and which generates an area signal by detecting an edge and a net points at a net points mode.

A configuration of an area signal generating portion 6 for generating the area signal from an edge signal and a net points signal when a net points processing mode is set is shown in FIG. 6. For generating the area signal from the edge signal and the net points, the edge signal is detected in edge detector 61 as described above and the net points signal is detected according to a pitch width of peak signals in the main and vertical scanning directions in net points detector 64. A photograph area is discriminated according to an AND condition of the net points signal and the edge signal in area discriminator 62, and a discriminating condition is outputted only when carrying out area separation processing by the mode set. For full-surface simultaneous processing, the area signal is fixed as described above.

Figure 7:
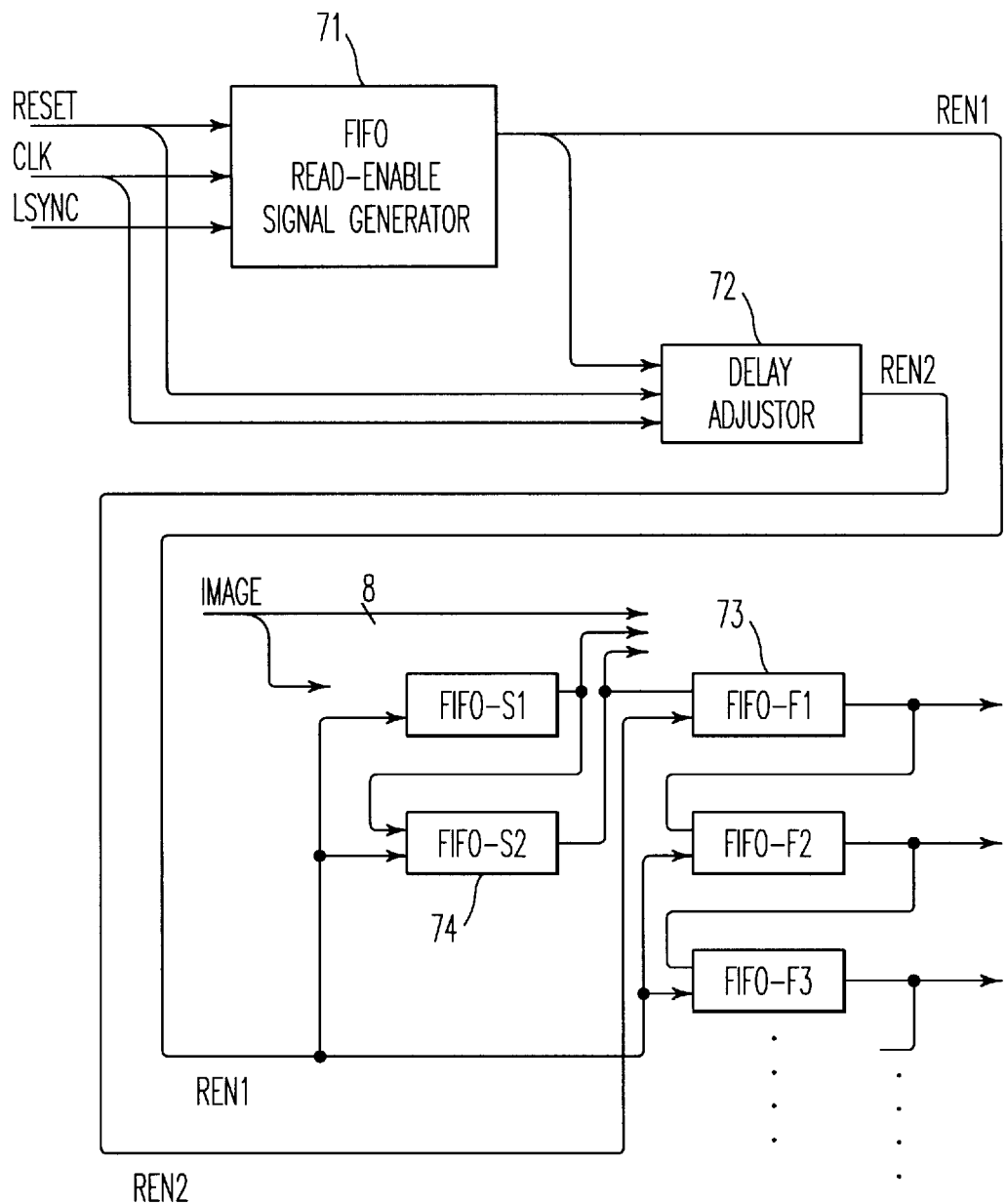
FIG. 7 is a block diagram showing a construction of a delaying apparatus for causing a location of the image data given to selector 5 to coincide with that of an area signal (changing-over signal) generated by an area signal generating portion 6 in the embodiment of the present invention shown in FIG. 1.

A configuration for controlling a generating position (discriminating position) of the area signal is shown in FIG. 7. The position of the area signal (changeover signal) which is an output of the area signal generating portion 6 and that of the filter output (the output of the pixel emphasizing portion 3 or the pixel smoothing portion 4) are adjusted with the number of FIFOs in the vertical scanning direction and with the delay quantity of the read enable signal of the FIFO in the main scanning direction in FIFO read-enable signal generator 71. A read enable REN1 is generated with the sync signal in the main scanning direction and a delay adjust signal REN2 for the REN1 signal is simultaneously generated by delay adjustor 72. For the outputs of FIFO-F1 and following FIFO-F2 and FIFO-F3, which are controlled with REN2, and the preceding FIFO-S2 and FIFO-S1, a delay quantity which is adjusted in the main scanning direction is generated. As shown in FIG. 1, input image data is simultaneously supplied to the delay signal generating portion 1 and the area signal generating portion 6, and therefore it is recommended to provide a delay signal generating portion shown in FIG. 7 at the head of the delay signal generating portion 1 or the head of the area signal generating portion 6.

Figure 8:
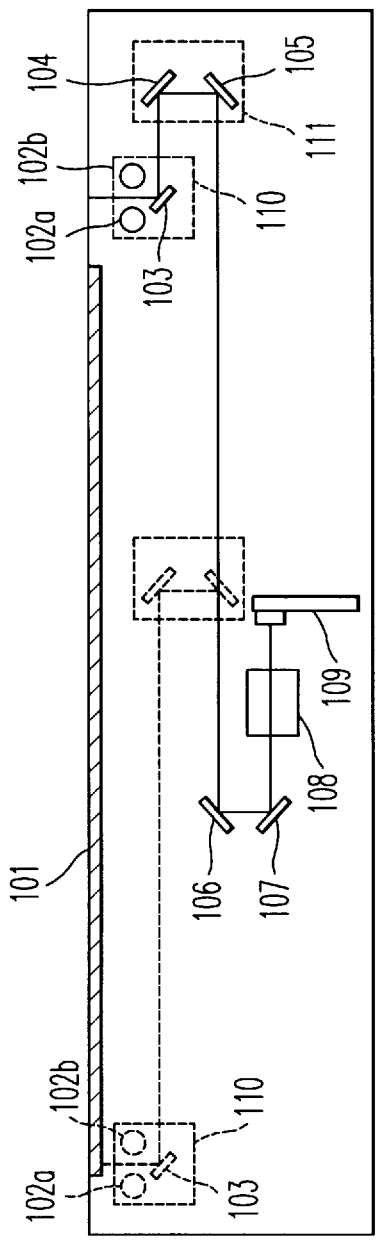
FIG. 8 is a longitudinal cross-sectional view showing an outlined construction of a manuscript document reading-out apparatus in another embodiment of a digital copying machine according to the present invention.

FIG. 8 shows a schematic configuration of an original reading apparatus of a digital copying machine which is an embodiment of the present invention. In FIG. 8 a contact glass 101 on which an original (not shown) to be read is set is irradiated by light sources 102a and 102b and a reflected light from the read original (original image) is focused on a light receiving surface of a CCD image sensor 109 through mirrors 103 to 107 and a lens 108. The light source 102 and the mirror 103 are mounted on a carriage which moves in the vertical scanning direction (a transversal direction in FIG. 8) in parallel to and below contact glass 101. Horizontal scanning is carried out by solid scanning with the CCD image sensor and the original image is read by the CCD image sensor whereby an entire original is scanned along with movement of the optical system as described above. In this embodiment, the reading pixel density is set to 16 pixels/mm both for main scanning and for vertical scanning, which is applicable to an A3 size (297 mm×420 mm) original.

Figure 9:
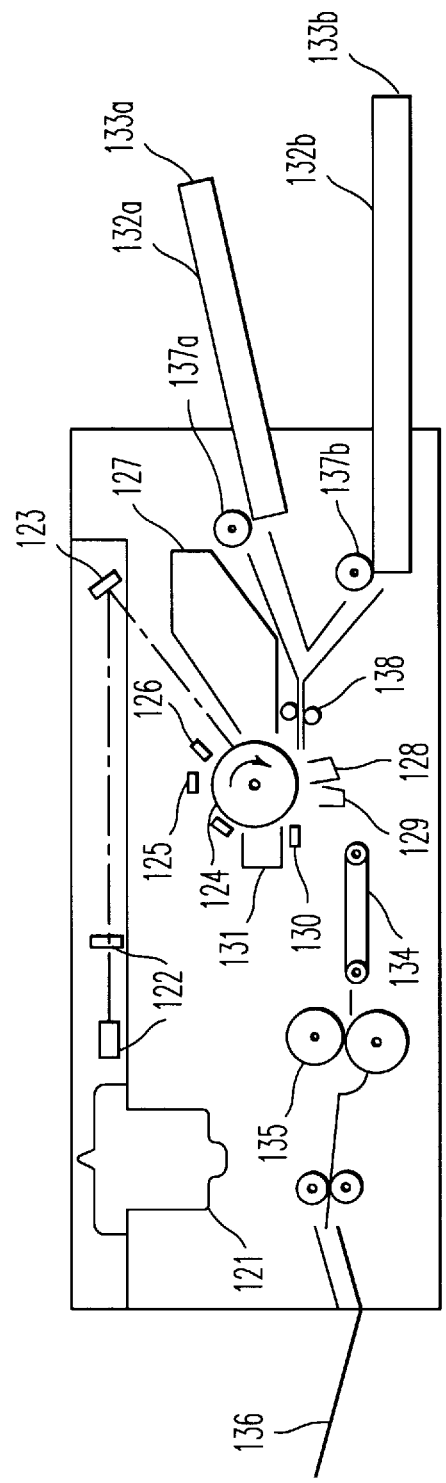
FIG. 9 is a longitudinal cross-sectional view showing an outlined construction of a laser printer performing the image formation in the above-mentioned digital copying machine.

FIG. 9 shows a construction of a laser printer for forming the image used in the digital copying machine which is an embodiment of the present invention. Though the original reader (FIG. 8) and the laser printer (FIG. 9) are integrated in most cases, they may be separated as individual units and only electrically connected. The laser printer is provided with a laser writing system, an image reproducing system and a paper feeding system. Laser diodes which serve as the laser light sources and a polygon mirror which is rotated by an electric motor at a fixed high speed are provided in a laser output unit 121 of the laser writing system. A laser light emitted from the laser output unit 121 is irradiated onto a photo-sensing drum 124 of the image reproducing system. The photo-sensing drum 124 is provided with a charger 125, an eraser 126, a developer unit: 127, a separation hook 130 and a cleaning unit 131 on its periphery. A beam sensor (not shown) for generating a main scanning sync signal (MSYNC) is arranged at a position nearby the photo-sensing drum 124 where the laser beam is irradiated.

The following briefly describes an image reproducing process in this laser printer. The peripheral surface of the photo-sensing drum 124 is uniformly charged to have a high potential by the charger 125. When the laser beam is irradiated onto this peripheral surface of the photo-sensing drum 124, the potential at the irradiated part is lowered. The laser beam is turned on and off in accordance with black/white for recording and reproduction, and laser irradiation energy on the surface of the photo-sensing drum 124 is controlled by pulse width modulation (PWM) or power modulation (PM). Consequently, a potential distribution corresponding to a halftone Level of a recorded image, that is, a static latent image, is formed on the surface of the photo-sensing drum 124. When a part on which the static latent image is formed passes through the developer unit 127, toner adheres to the surface of the photo-sensing drum 124 in accordance with the potential level and a visualized toner image is formed. A recording sheet 132 is fed to the part with the toner image at a specified timing and the toner image is transferred onto the recording sheet 132. After this, the recording sheet 132 is separated from the photo-sensing drum 124 by the separation charger 129 and the separation hook 130. The separated recording sheet 132 is conveyed by the conveyor belt 134 and the image is fixed by heating with a fixing roller 135 which incorporates a heater, and the recording sheet 132 is ejected onto a paper tray 136.

In this embodiment, the paper feeding system includes two paper feeding channels. In one of these paper feeding channels, recording papers 132a in an upper paper feeding cassette 133a are fed by a paper feed roller 137a, while recording sheets 132b in a lower paper feeding cassette 133b are fed by a paper feed roller 137b. A recording sheet 132 fed by one of these paper feed rollers 137 is temporarily stopped as being kept in contact with a resist roller 138 and is fed into the photo-sensing drum 124 at a timing synchronized with a progress of the recording process. Though not shown, the paper feeding systems are respectively provided with a recording sheet size detection sensor for detecting the sizes of recording sheets 132a and 132b stored in the paper cassettes 133a and 133b.

Figure 10:
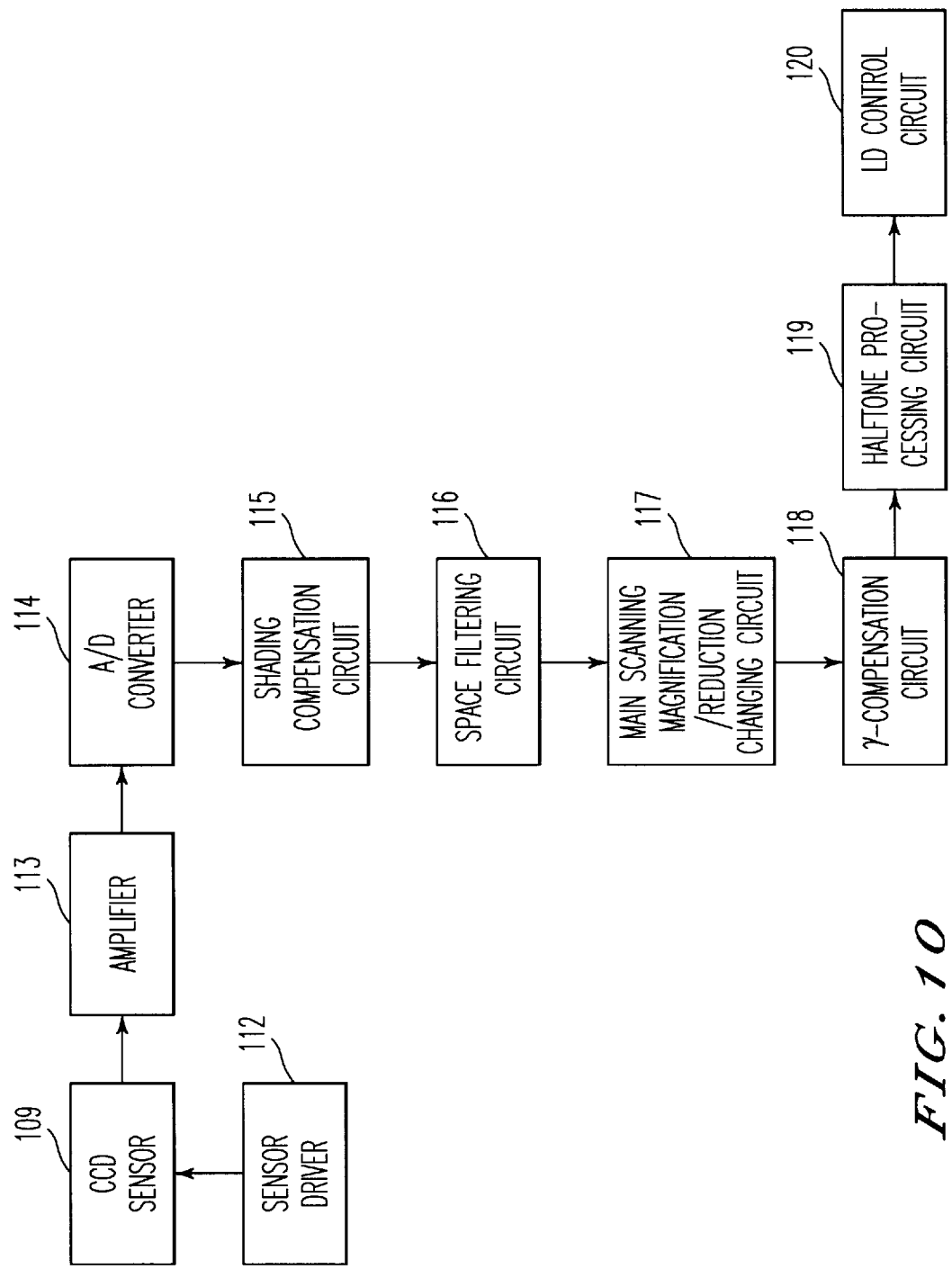
FIG. 10 is a block diagram showing an order of processing the image in an image processing electric system of the above-mentioned digital copying machine.

An image processing electrical system and an image processing mode of the digital copying machine are described below. FIG. 10 shows an image data processing sequence in the image processing electrical system. In FIG. 10, reference numeral 112 is a sensor driver circuit, 109 is a CCD image sensor, 113 is an amplifier, 114 is an A/D converter, 115 is a shading compensation circuit, 116 is a space filtering circuit, 117 is a main scanning magnification/reduction changing circuit, 118 is a γ-compensation circuit, 119 is a halftone processing circuit, and 120 is a LD (laser diode) control circuit.

An image signal which is read at the sampling density of 16 pixels/mm as described above is amplified to a specified voltage amplitude by the amplifier 113 and is subsequently converted by the A/D converter 114 to digital data of n-th power halftone of 2 per pixel. The shading compensation circuit 115 carries out shading compensation for compensating unevenness of the illumination intensity of the light sources 102a and 102b and variations of sensitivity of respective elements of the CDD image sensor 109. The space filtering circuit 116 performs MTF compensation for improving the resolution of characters and graphical images, eliminating signal noise and smoothing for improving reproducibility of photographs. After this, the main scanning magnification/reduction changing circuit 117 carries out magnification/reduction processing in accordance with the setting of the magnification,(reduction function and successively for γ compensation the γ compensation circuit 118 compensates the value which meets the density setting function. The recording image signal is transmitted to the LD control circuit 120 through the halftone processing circuit 119 for carrying out halftone processing in accordance with the image setting function. The LD control circuit 120 generates a lighting signal for laser diodes (LD) according to the image signal transmitted.

In this embodiment, shortly after the power supply of the copying machine has been turned to ON or when it is reset to an initial state by a reset function, the image mode is set to an automatic character/photograph mode and contents of image processing is such that a filter for the character part and a filter for the photograph part are changed over in accordance with the area separation processing in the space filtering circuit 116, and the halftone processing is carried out with respect to each pixel of the character part and the photograph part is processed with two pixels for main scanning as one unit.

Figure 11:
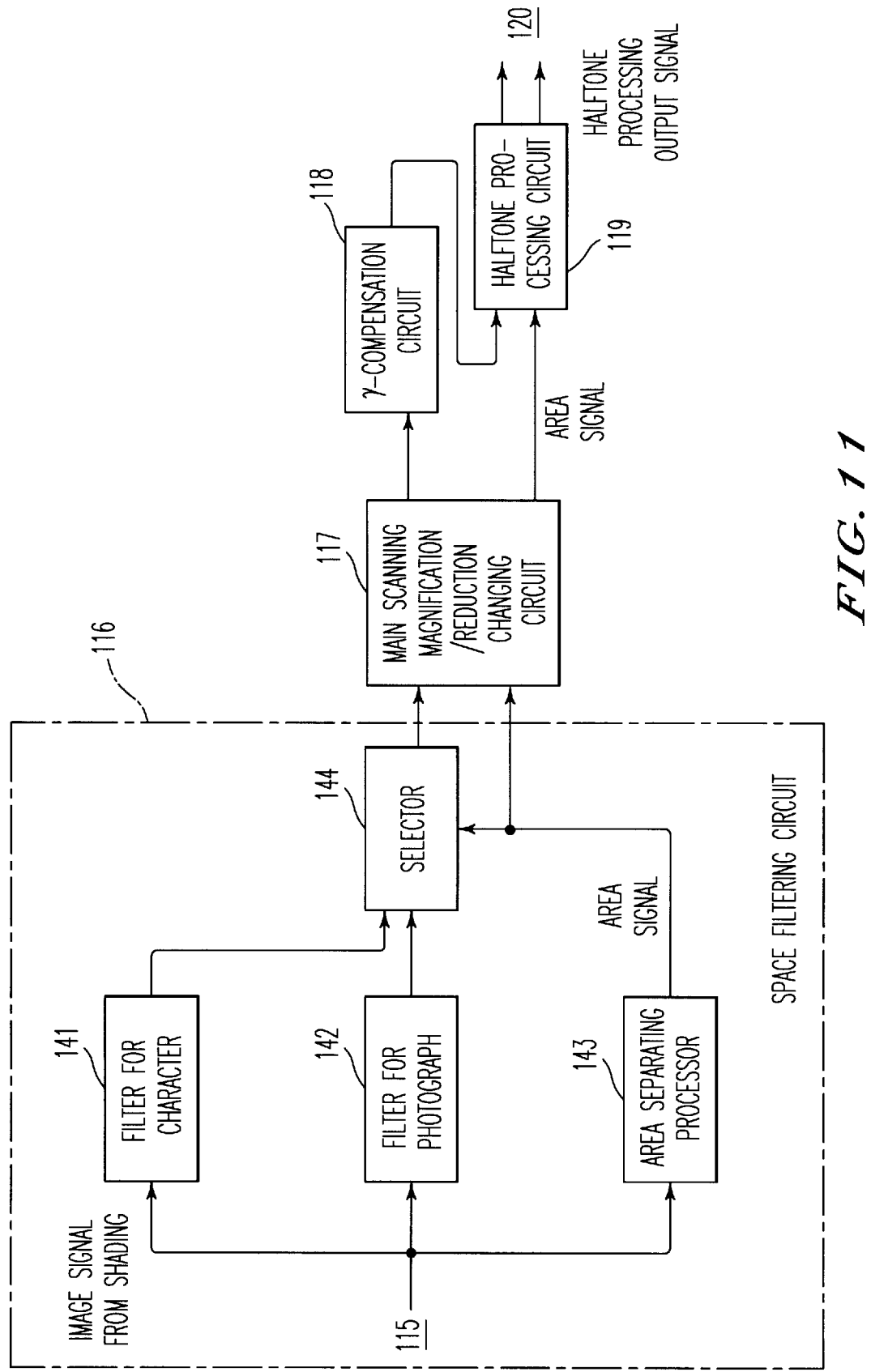
FIG. 11 is a block diagram showing an outlined construction of a space filter 116 shown in FIG. 10.

FIG. 11 shows a schematic configuration of the space filtering circuit 116 and the relationship between the space filtering circuit 116 and the main scanning magnification/reduction changing portion 117, the γ compensation portion 118 and the halftone processing portion 119.

When the shading-compensated image signal is input into the space filtering circuit 116, it is subjected to filtering for the character part 141 and filtering for the photograph part 142 in parallel. In addition, the output signals (for example "1" represents the photograph part and "0" represents the character part) of the area separation portions 143 which are provided in parallel select in selector 144 an output for the character part and an output for the photograph part, and output the selected outputs to the main scanning magnification/reduction changing portion 117. Moreover, the output signal of the area separation portion 143 is transmitted as the area signal to the halftone processing portion 119 through the main scanning magnification/reduction changing portion 117. On the other hand, the image output is transmitted to the halftone processing portion 119 through the main scanning magnification/reduction changing portion 117 and the γ compensation portion 118 after having been selected according to the area signal of the space filtering circuit 116.

Figure 12A:
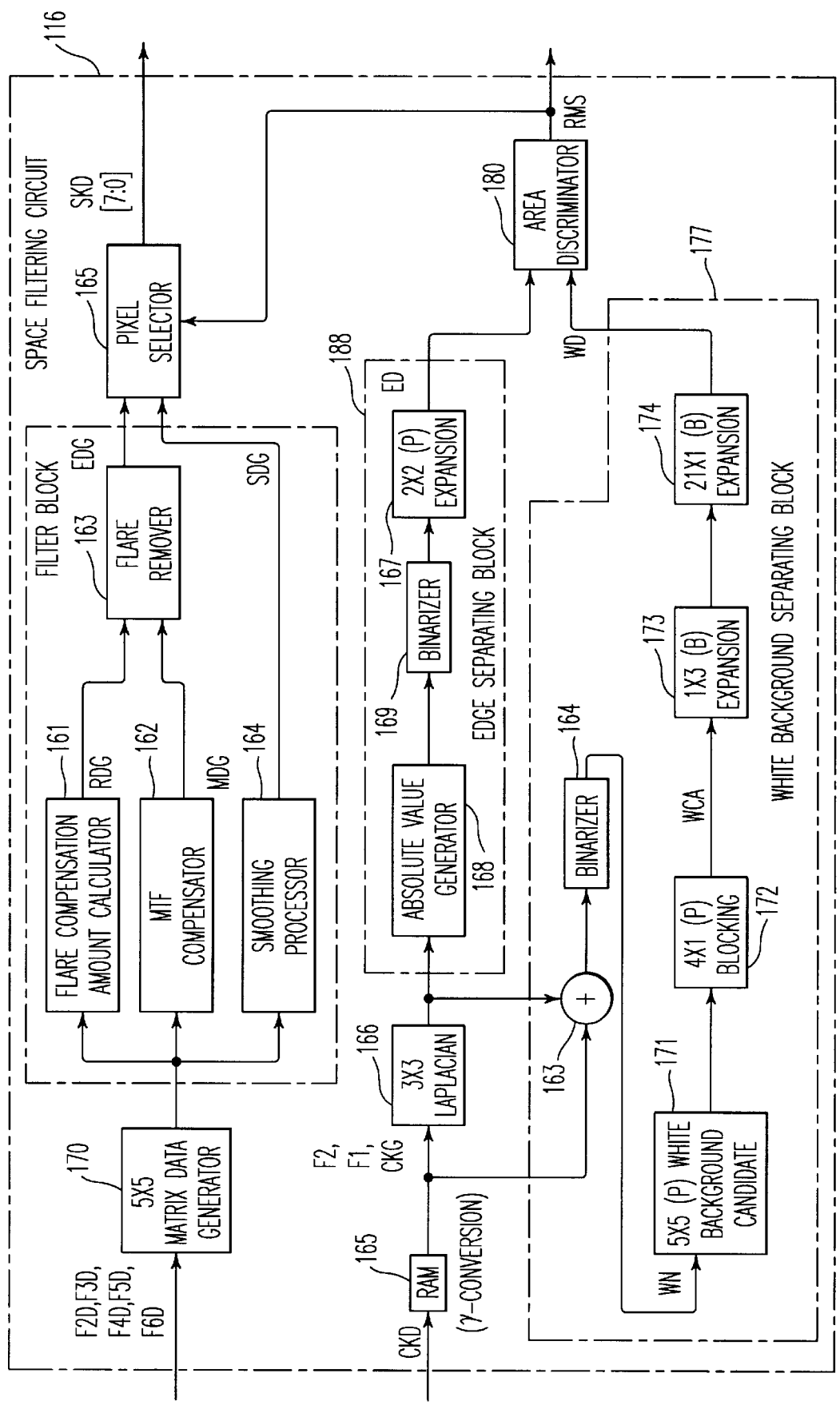
FIGS. 12a and 12b are block diagrams showing a construction of a space filter 116 shown in FIG. 10 in detail.
Figure 12B:
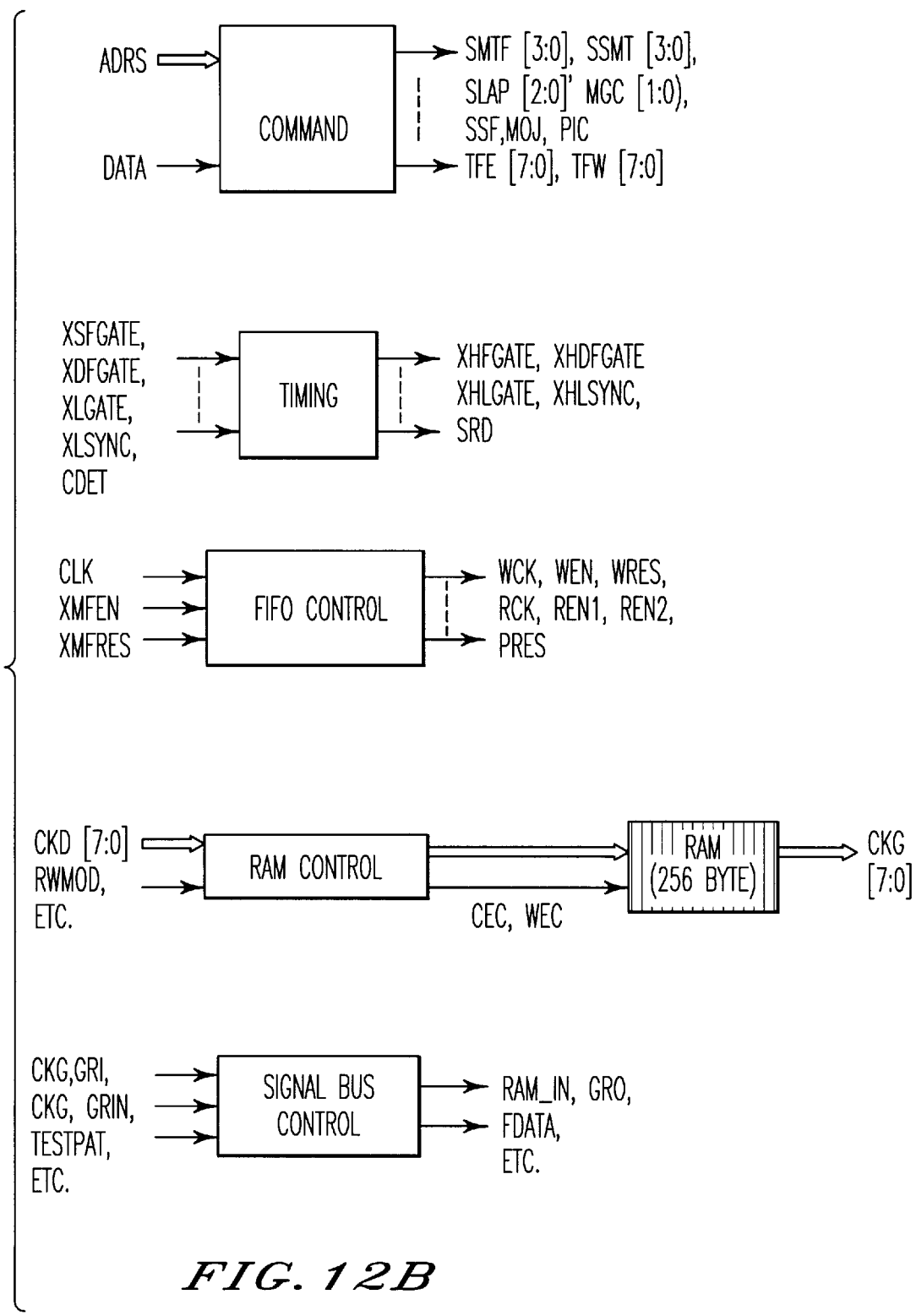
Figure 13:
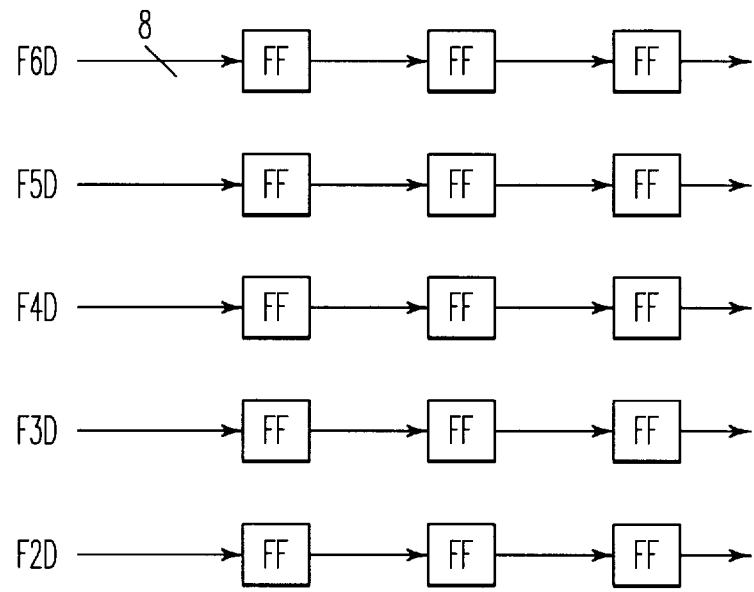
FIG. 13 is a block diagram showing a content of a 5×5 matrix data generating block shown in FIG. 12.

FIG. 12 shows in detail the configuration of the space filtering circuit 116. The input image signal is given γ compensation in response to the scanner and is supplied to 3×3 LAPLACIAN block 166. On the other hand, the input image signal is delayed (2 to 6 lines) in the sub-scanning direction by an external FIFO and is supplied to 5×5 MATRIX DATA GENERATOR block 170. Output SKD of PIXEL SELECTOR block 165 is the filtered image signal and output RMS of AREA DISCRIMINATOR block 180 is the separation signals for the character area and the photograph area. FIG. 13 shows the contents of the 5×5 MATRIX DATA GENERATOR block 170. The 5×5 MATRIX DATA GENERATOR block 170 is given input image signals F2D to F6D which are delayed by 2 to 6 lines in the sub-scanning direction and 55 pixels in the main scanning direction and generates the delay data of these 3×5 areas.

Figure 14:
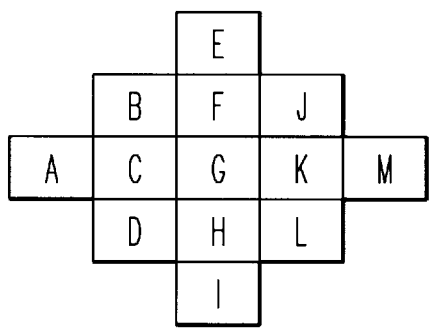
FIG. 14 is a plan view showing a pixel distribution referring to a calculation performed in the 5×5 pixels matrix to be processed in a flare compensation amount calculator block shown in FIG. 12.

THE FLARE COMPENSATION AMOUNT CALCULATOR block 161 shown in FIG. 12 accumulates the pixel levels having values less than T of N=13 pixels A to M shown in FIG. 14 in the 5×5 pixel area, averages the results with N and uses the mean value as a flare compensation amount RDG of the noticeable pixel G.

Figure 15:
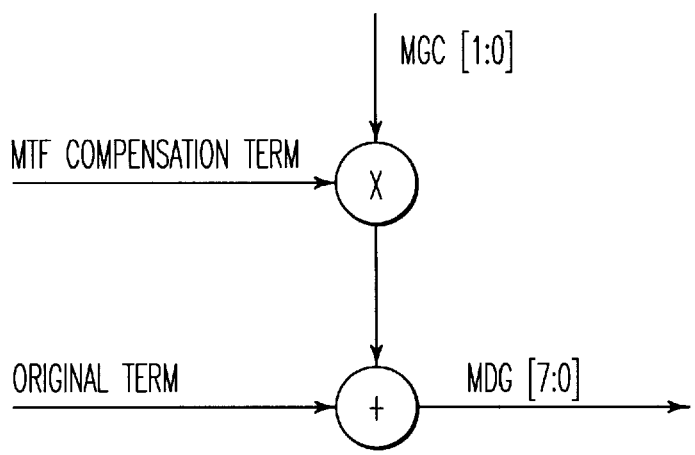
FIG. 15 is a block diagram showing a processing logic of an MTF compensator block shown in FIG. 12.

The processing logic of the MTF COMPENSATOR block 162 shown in FIG. 12 is shown in FIG. 15. This MTF COMPENSATOR block 162 divides the filter coefficients into a compensation term and an original term and adds a value obtained by multiplying the above MTF compensation term by a magnification shown with a magnification signal MGC generated in accordance with an image processing mode designation signal to the noticeable pixel located at the central part of the 5×5 pixel matrix. The filter coefficients for MTF compensation for use in the above are shown in FIGS. 16a to 16e. The filter coefficients of SMTF=1 shown in FIGS. 16a to 16e are used in the "character mode" and the filter coefficients of SMTF=4 are used in the "pencil mode".

The FLARE REMOVER block 163 shown in FIG. 12 subtracts the output RDG of the FLARE COMPENSATION AMOUNT CALCULATOR block 161 from the output MDG of MTF COMPENSATOR block 162, and outputs the result of this subtraction to the PIXEL SELECTOR block 165 when the "character mode" is designated. In the "pencil mode", the flare removal is not carried out and the output MDG of the MTF COMPENSATOR block 162 is outputted to the PIXEL SELECTOR block 165.

THE SMOOTHING PROCESSOR block 164 shown in FIG. 12 carries out a smoothing operation by using filters having flat characteristics in the weak and strong tone areas and the special frequency area. Filter coefficients used in this filtering processing are shown in FIGS. 17a to 17h.

The 3×3 LAPLACIAN block 166 shown in FIG. 12 carries out filtering of the image signal CKG γ-compensated by the scanner and image signals F1 and F2 which are delayed as much as one and two lines in the sub-scanning direction as the input. Filter coefficients used in this filtering processing are shown in FIG. 18. The output of the 3×3 LAPLACIAN block 166 is composed of 11 bits with a sign. The EDGE SEPARATOR block 188 shown in FIG. 12 discriminates an edge pixel through expansion processing to 2×2 pixels after carrying out binary processing of an absolute value of an output with a sign of the 3×3 LAPLACIAN block 166 and an edge candidate has been extracted. The result determined by expansion is not used as expansion data for a next separation. The noticeable pixel in expansion processing is a right lower pixel of the 2×2 pixel matrix. The relationship thereof is shown in FIG. 12. In the binary processing, a value larger than the threshold TFE [7:0] shall be the edge candidate.

The WHITE BACKGROUND SEPARATOR block 177 shown in FIG. 12 adds the output CKG of the 3×3 LAPLACIAN block 166 to the original data of prior to binary processing of image signals and carried out MTF compensation. An algorithm for separating the white background is shown below.

(1) MTF compensation

MTF compensation of the original data is carried out. The intensity magnification of the compensation term is determined variable and the output CKG of the 3×3 LAPLACIAN block 166 is added to the image signal CKG after SLAP [2:0] multiplication.

(2) Binarizing

The compensation output detects a pixel nearer to the white background side than the threshold TFE [7:0] as a white pixel.

(3) Detection of the white background candidate

Pattern matching of the 5×5 pixel matrix pattern shown in FIG. 20 is carried out to detect a pattern in which all 2×5 or 5×2 areas are white pixels.

(4) Block division and expansion

Figure 21:
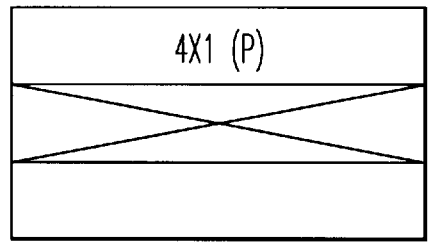
FIG. 21 is a plan view showing a relationship of a noticeable block and an expansion block for block-forming and expansion processing in a white background separating block shown in FIG. 12.

The area is divided into blocks each including 4×1 pixels and, when at least one white pixel is contained in a block, the noticeable block is regarded as a white block and is expanded by one block above and below in the sub-scanning direction. This mode is shown in FIG. 21.

(5) Block compensation

Figure 22:
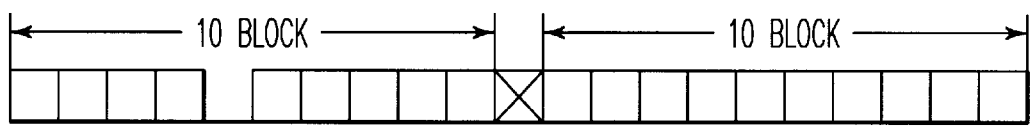
FIG. 22 is a plan view showing a relationship of a referring block and treatment block in performing block compensation in a white background separating block shown in FIG. 12.

A block of 21×1 pixels (one block is composed of 4×1 pixels) is prepared and, when at least one white block is contained in this block, the noticeable block (center block) is regarded as the white block. This relationship is shown in FIG. 22.

The AREA DISCRIMINATOR block 180 shown in FIG. 12 discriminates the area according to data ED which represents the edge separation result of the EDGE SEPARATOR block 188 and data WD which represents the result of white background separation of the WHITE BACKGROUND SEPARATOR block 177. The table of truth values for discrimination of the area are as shown in Table 1.

TABLE 1

| Result of White Background Separation | Result of Edge Separation | Result of Area Discrimination |
|---|---|---|
| White Background (WD = 1) | Edge (ED = 1) | Character Area (RMS = 0) |
|  | Non-edge (ED = 0) | Picture Area (RMS = 1) |
| Non-white Background (WD = 0) | — | (RMS = 1) |

The PIXEL SELECTOR block 165 shown in FIG. 12 selects output pixels according to the result of area discrimination shown in Table 1 and the designated image processing mode. A table of truth values for pixel selection is shown in Table 2. The processing mode in Table 2 is an image processing mode.

TABLE 2

|  | (Setting Command) | | Output Signal (SKD) | |
|---|---|---|---|---|
| Processing Mode | MOJ | PIC | RMS = 0 | RMS = 1 |
| Processing Mode | 0 | 0 | EGD [7:0] | |
| Processing Mode | 1 | 0 | EDG [7:0] | SDG [7:0] |
| Character Mode | 0 | 1 | SDG [7:0] | |
| Character/ Photograph | 1 | 1 | EDG [7:0] | SDG [7:0] |

EDG: MTF compensator signal
SDG: Smoothing processor signal

Figure 23:
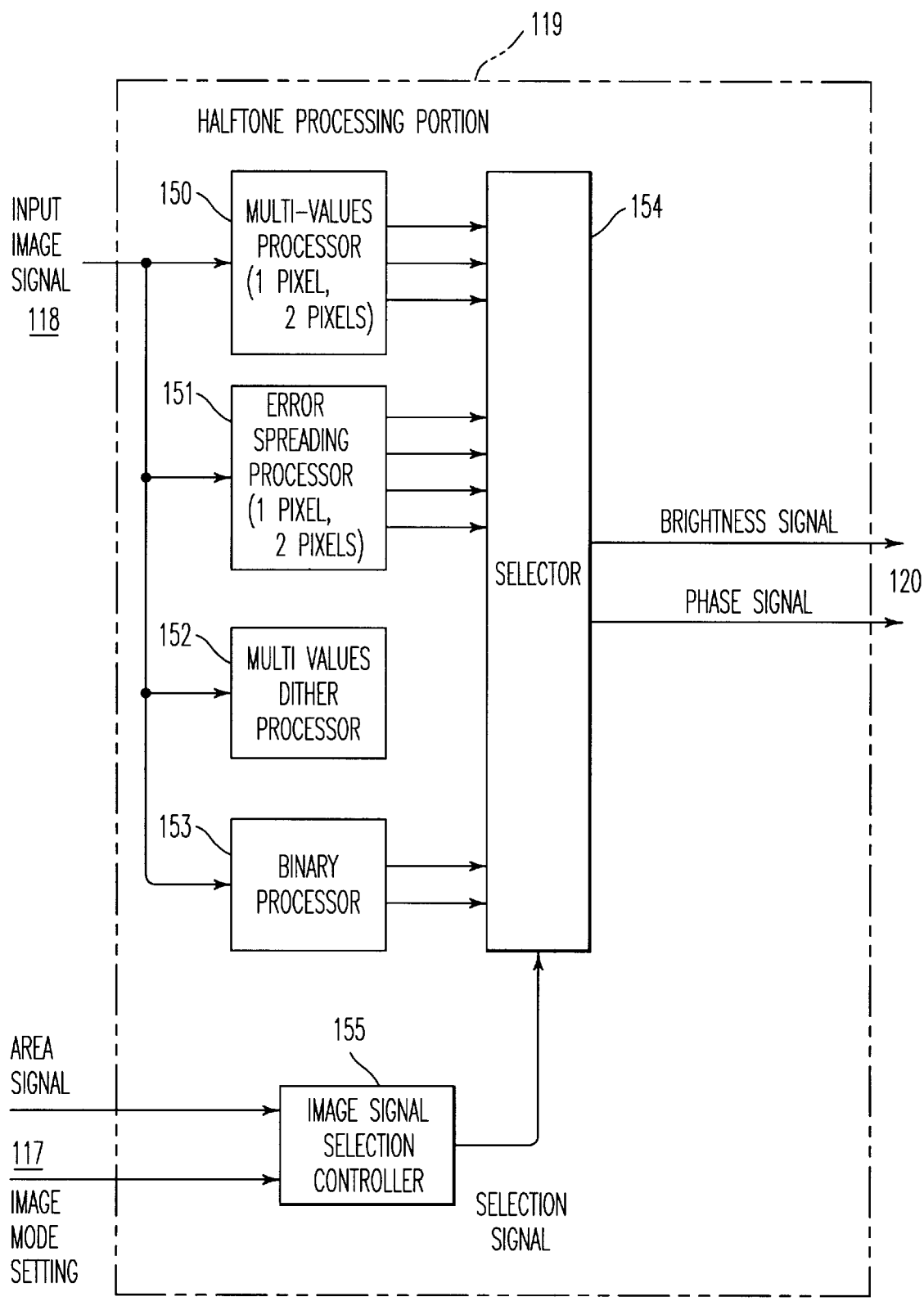
FIG. 23 is a block diagram showing an outlined construction of a halftone processing circuit 119 shown in FIG. 10.

A configuration of the halftone processing circuit 119 shown in FIGS. 10 and 11 is shown in FIG. 23. The halftone processing circuit 119 transfers the γ-compensated image signal to the printer portion (LD control circuit 20) and converts it to a LD lighting signal. In this case, image quality processing is carried out by several processing methods in parallel to change the quality of an output image.

In this embodiment, multi-values processing 150, error spreading processing 151, multi-values dither processing 152 and binary processing 153 are available as shown in FIG. 23. In this case, multi-values processing 150 and error spreading processing 151 are available in two types of processings such as one-pixel processing and two-pixel processing.

Figures 24, 25:
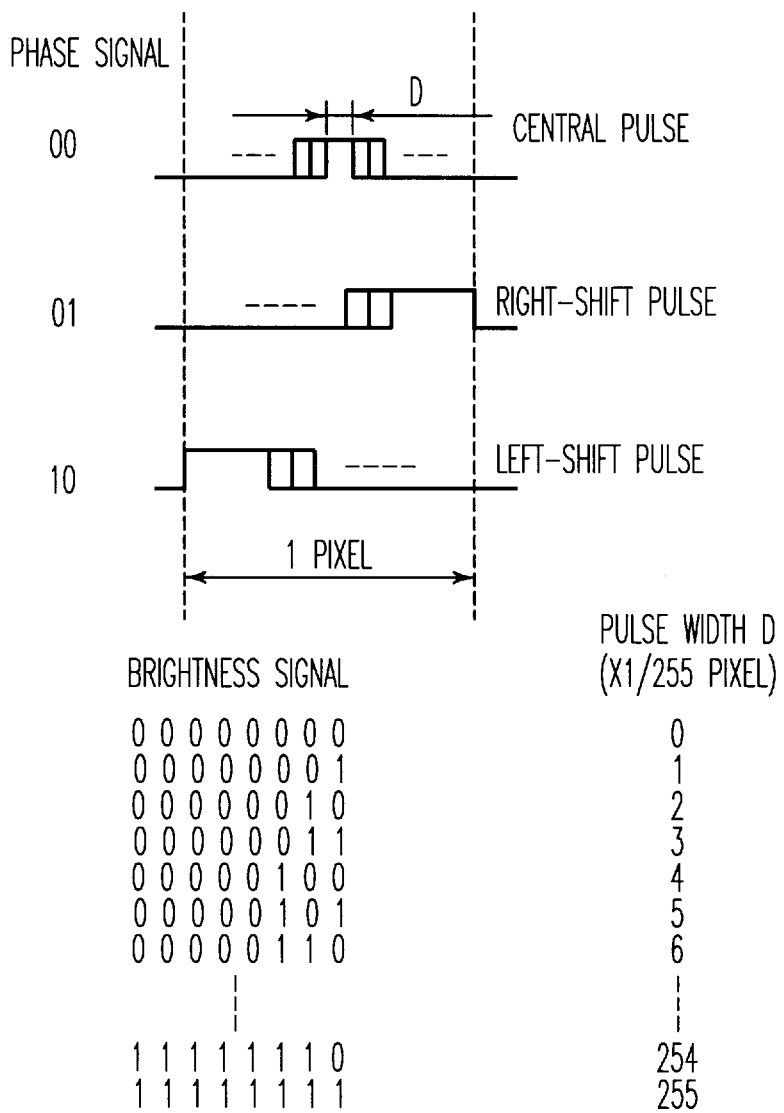
FIG. 24 is a diagram showing a phase signal and brightness signal both outputted by the halftone processing circuit 119, wherein the phase signal is shown by a time chart and the brightness signal is shown by a bit distribution plan view.
FIG. 25 is a plan view showing weighted coefficients of a re-quantumizing error distribution for an error diffusing process in the halftone processing circuit 119 shown in FIG. 23.

Prior to the description of the contents of the image quality processing, a format of the image signal to be outputted from the halftone processing circuit 119 is described below. As described above, the output signal from the halftone processing circuit 119 is a lighting signal for LDs. Accordingly, the format of this signal will be changed according to the LD lighting system. In the case of this embodiment, the LD lighting modulation system is based on a pulse width modulation of 256 tone scales by which the phase of the lighting pulse (left-shift pulse and right-shift pulse) can be controlled. The LD lighting pulse comprises ten bits in total, that is, eight bits of a brightness signal which denote the modulation level (0–255) and two bits of a phase signal. A relationship between the halftone processing output signal and the LD lighting pulse is shown in FIG. 24. The image signal after halftone processing is a signal comprising ten bits in total, that is, eight bits of the "brightness signal" and two bits of the "phase signal" as shown in FIG. 24.

The contents of the respective halftone processing shown in FIG. 23 are described below. In the multi-values processing 150, the control of the phase signal and the one-pixel and two-pixel processings are carried out. Phase control in one-pixel processing is such that the sizes of adjacent pixels are compared and the phase is shifted to the larger pixel (more blackish pixel). However, if the phase is simply changed only according to the sizes of adjacent pixels, a texture is produced by a random noise, and therefore the phase is controlled only when the difference of density (data error) of two right and left pixels exceeds a specified threshold and the central pulse is fixed in other cases.

In the case of two-pixel processing, the right-shift pulse is assigned to a left-side pixel and the left shift pulse is assigned to a right side pulse so that black portions of two applicable pixels contact each other. In other words, the right-shift pulse is assigned to, for example, a pixel at an odd number order and the left-shift pulse is assigned to a pixel at an even number order, in the main scanning direction. Processing of the brightness signal is such that the γ-converted data is directly outputted in the case of one-pixel processing and data of two pixels is added and each half of the result of this addition is assigned to both pixels, respectively.

The error spreading processor portion 151 adds a re-quantitized error (converted to a LD lighting brightness signal) generated from an ambient pixel with a specified weight to the noticeable pixel, re-quantitizes the result of addition, converts it to a brightness signal, and outputs an error of the pixel. Weighting for allocating the error is shown with a matrix as shown in FIG. 25. A magnitude of the error depends on the quantitizing level. Since the data after γ conversion has 256 scales, the error is 0 if the brightness signal has 256 scales and 3 if the brightness signal has 64 scales.

In the present invention, the quantitizing level of the brightness signal includes nine scales and the error is 31, maximum. Though an error of one pixel is 31, maximum, and the total of weighting shown with the matrix is 32, a total of errors of ambient pixels is 31, maximum, since the total is multiplied by $\frac{1}{32}$. This is added to the data after γ conversion and therefore the total number of scales is 286, maximum. This total number is divided into nine scales in 32 steps. In this case, when data=32×n+c (n and c are integers), n denotes the error spreading output and c denotes an error. Though output n is 0 to 8, the format of the brightness signal has 256 scales as described above and therefore the values of 0 to 255 should be assigned to n0 to n8, respectively. Assignment in this embodiment is shown in FIG. 26(a). Also in error spreading processing 151, two-pixel processing is executed as the multi-values processing. Error spreading output n is added in terms of two pixels and the result of the addition is assigned to pixels. The result of the addition is 0 to 16 and brightness signals 0 to 25 are assigned as in the case of one-pixel processing. Assignment in this embodiment is shown in FIG. 26(b).

In the error spreading processing 151, phase control is carried out as multi-values processing. The phase control method differs with one-pixel processing and two-pixel processing and is completely the same as multi-values processing.

Figure 27A:
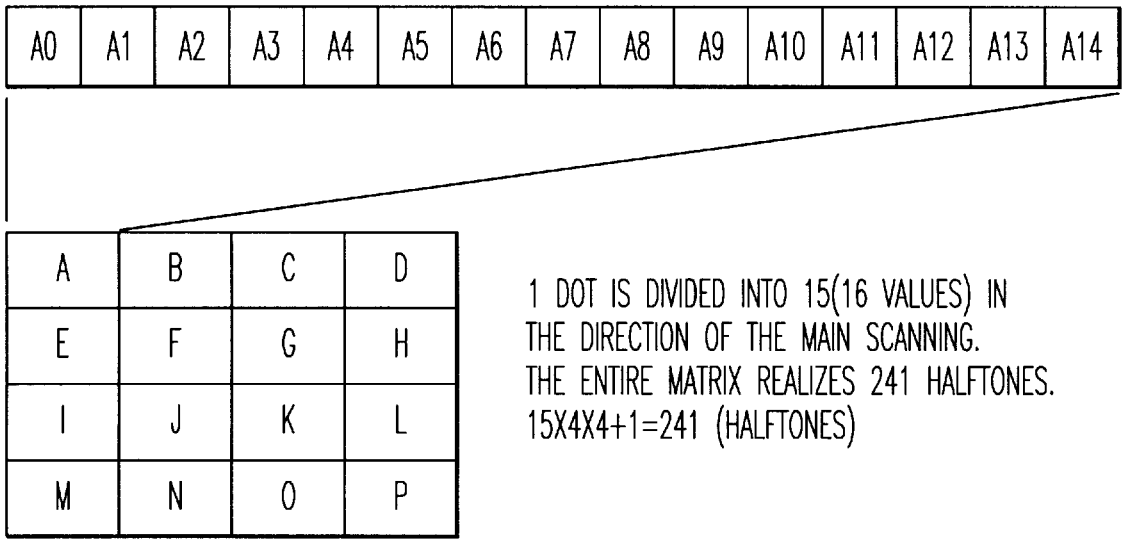
FIG. 27 is a plan view showing a status of dividing multi-values data for a multi-values dither processing in the halftone processing circuit 119 shown in FIG. 23.
Figure 27B:
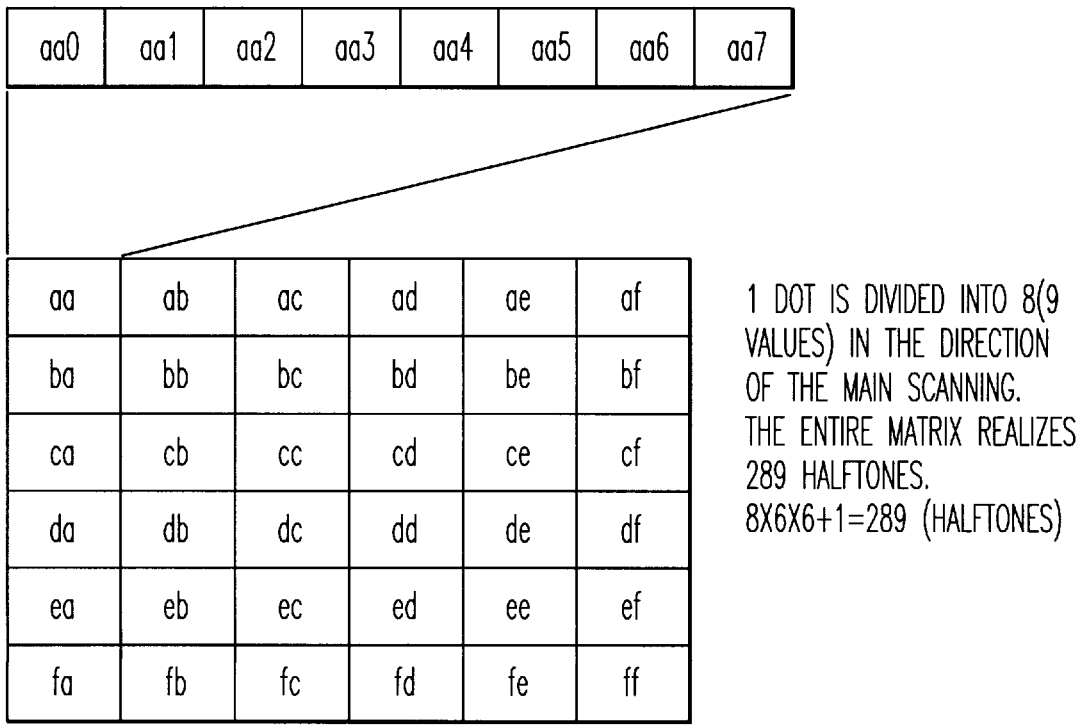

The following describes the multi-values dither processing 152. Multi-values dither processing 152 is dither processing in which one pixel is deemed to have multiple values. One pixel is divided in the main scanning direction assuming that the pulse width of the LD lighting signal is modulated. The dividing mode is shown in FIG. 27. In the present invention, the size of the dither matrix is 4×4 and 6×6. In the case of the 4×4 dither matrix, one pixel is divided into 15, thereby allowing reproduction of 4×4×15+1=241 scales. In the case of the 4×4 dither matrix, one pixel is divided into 8, thereby allowing reproduction of 6×6×8+1= 289 scales. However, those divided segments of one pixel cannot be independently turned to ON/OFF, differing from independent pixels, and only the pulse width can be expanded continuously from the left end, the right end or the center.

In other words, for arraying the threshold values in respective divided segments, a monotonous increase from the left, a monotonous increase from the right or a gradual expansion from the center to the periphery can only be selected. In this case, the pixel in the monotonous increase from the left is the left side pulse, the pixel in the monotonous increase from the right is the right side pulse, and the pixel in the increase from the center is the central pulse. Accordingly, the phase signal of the pixel is determined by the array of threshold values. The brightness signal is determined in accordance with how many divided threshold values the image data of the pixel (after γ conversion) has exceeded.

The binary processing 153 is described below. Binarizing is a processing for converting the pixel to a white or black value (0 or 1) and is carried out according to whether or not the image data exceeds the threshold values. In this embodiment, binary processing 153 is available in two types of processing, that is, binary processing with fixed threshold values and dither binary processing. Though the result of binary processing appears as a one-bit signal, output signals (brightness signal+phase signal) corresponding to the white background pixel and output signals corresponding to the black pixel are predetermined and converted according to the result of binary processing since the signal should be matched with the format of the LD lighting signal.

The image signal selection control portion 155 and the selector portion 154 are described below. Multi-values processing 150, error spreading processing 151, multi-values dither processing 152 and binary processing 153 are simultaneously carried out in parallel. One of these output signals is selected by selector 154 according to the image processing mode or the area signal.

Setting of the image processing mode is such that one mode is set for one copying operation. The area signal is a signal for discriminating the character area and the photograph area of a sheet of copy, and is therefore changed over at real time in one original. A first example of the selecting method is shown in Table 3 below and a second example is shown in Table 4 below.

TABLE 3

| Image Mode | Area Signal | Selected Image |
|---|---|---|
| Automatic Character | Character | Multi-values Processing, One-pixel Processing |
| Photograph | Photograph | Error Spreading, Two-pixel Processing |
| Photograph | Character | — |
|  | Photograph | Multi-values Dither Processing, 4 × 4 |
| Pencil Character | Character | Multi-values Processing, On-pixel Processing |
|  | Photograph | — |
| Recopied Original | Character | Multi-values Processing, One-pixel Processing |
|  | Photograph | — |

Note:
The dashed line columns means other processing which has nothing to do with the area signal.

TABLE 4

| Image Mode | Area Signal | Selected Image |
|---|---|---|
| Automatic | Character | Multi-values Processing, One-pixel Processing |
|  | Photograph | Multi-values Processing, Two-pixel Processing |
| Character Photograph | Character | Multi-values Processing, One-pixel Processing |
|  | Photograph | Error Spreading, Two-pixel Processing |
| Photograph | Character | — |
|  | Photograph | Multi-values Dither Processing, 6 × 6 |
| Pencil Character | Character | Multi-values Processing, One-pixel Processing |
|  | Photograph | — |
| Recopied Original | Character | Multi-values Processing, One-pixel Processing |
|  | Photograph | — |

An image processing mode is selected on the operation panel. The arrangement of the operation panel in a case of the first example is shown in FIG. 30(a) and the arrangement of the operation panel in a case of the second example is shown in FIG. 30(b).

Figure 30A:
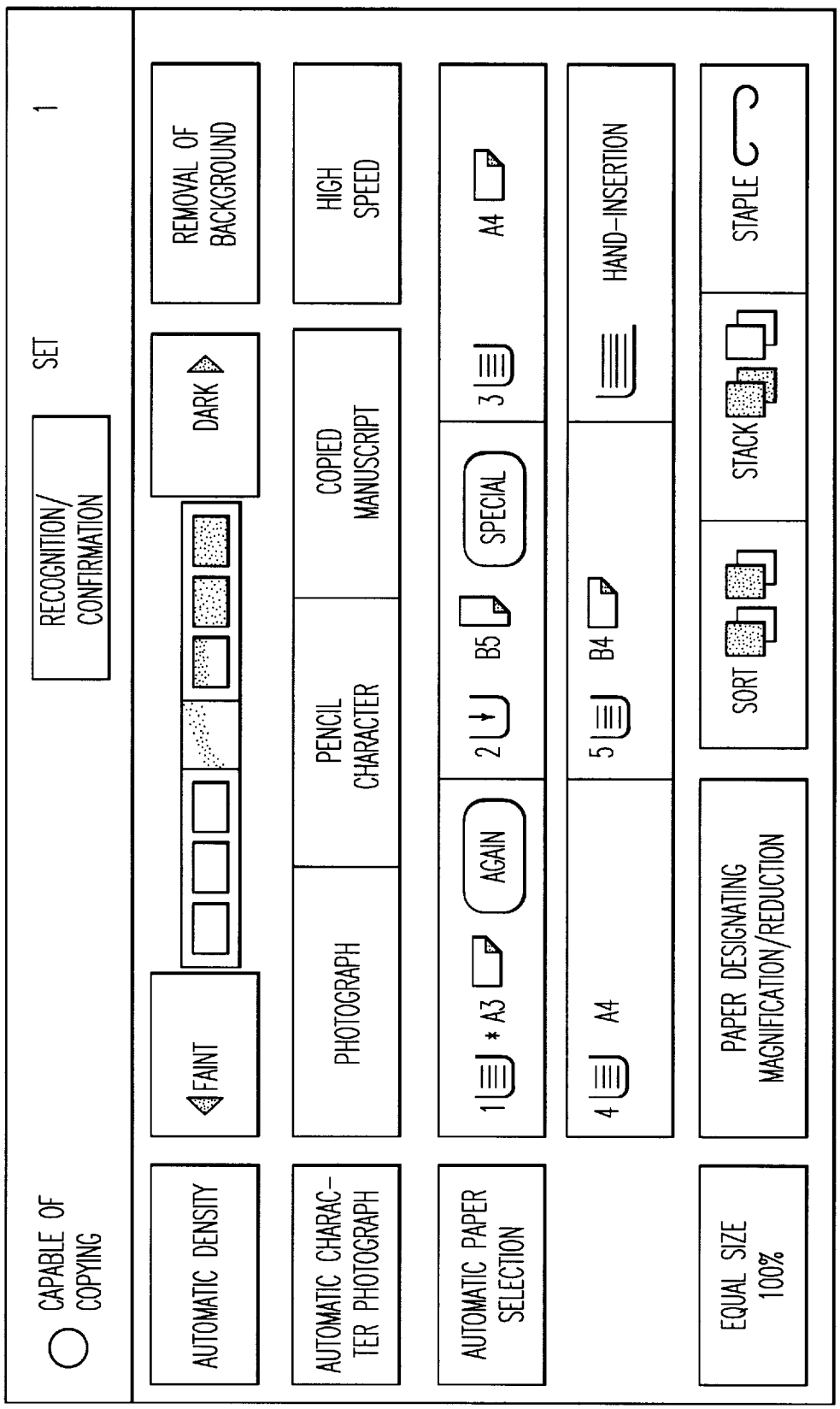
FIGS. 30a and 30b are plan views showing a part of an operation panel of the afore-mentioned digital copying machine.

In the first example, "automatic character/photograph" in Table 3 and FIG. 30(a) is a preferential image processing mode which is set shortly after the power supply is turned on, after a lapse of a specified time after completion of a copying operation and when "automatic character/ photograph" on the operation panel is operated. When this mode is set, the control signal which designates "character/ photograph" shown in Table 2 is supplied to the PIXEL SELECTOR block 165 of the space filter circuit 116 and the control signal which designates both "multi-values processing" and "error spreading processing" is supplied to the halftone processing circuit 119, and moreover the area discrimination signal RMS is supplied from the space filtering circuit 116 to the halftone processing circuit 119. In response to these control signals, the halftone processing circuit 119 carries out image processing (the description of the selected image) shown in the "automatic character/ photograph" column of Table 3. "Photograph", "pencil character" and "recopied original" in Table 3 and FIG. 30(a) are the modes which are designated by key inputs and these image processing modes are set when the corresponding keys are operated. According to a similar relationship to the above-described "automatic character/photograph" mode, the control signal for designating image processing (the description of the selected image) shown in Table 3 is supplied to the halftone processing circuit 119, and moreover the area discrimination signal RMS is supplied from the space filtering circuit 116 to the halftone processing circuit 119.

Figure 30B:
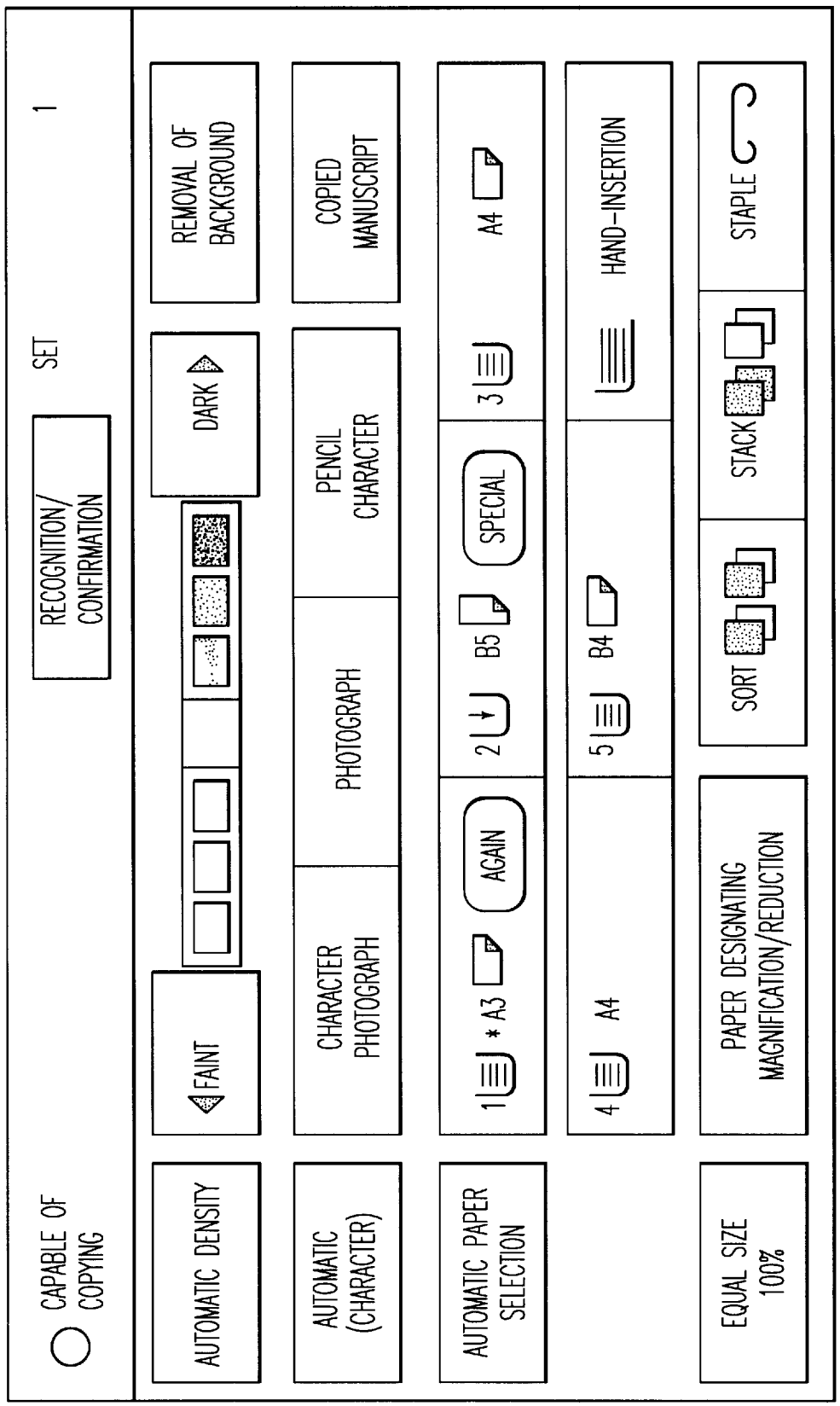

In the second example, "auto" in Table 4 and FIG. 30(b) is a preferential image processing mode which is set shortly after the power supply is turned on, after a lapse of a specified time after completion of a copying operation and when "auto" on the operation panel is operated. When this mode is set, the control signal which designates "character/photograph" shown in Table 2 is supplied to the PIXEL SELECTOR block 165 of the space filter circuit 116 and the control signal which designates "multi-values processing" is supplied to the halftone processing circuit 119, and moreover the area discrimination signal RMS is supplied from the space filtering circuit 116 to the halftone processing circuit 119. In response to these control signals, the halftone processing circuit 119 carries out image processing (the description of the selected image) shown in the "auto" column of Table 4. "Photograph", "pencil character" and "recopied original" in Table 4 and FIG. 30(b) are the modes which are designated by key inputs and these image processing modes are set when the corresponding keys are operated. According to a similar relationship to the above-described "automatic character/photograph" mode, the control signal for designating image processing (the description of the selected image) shown in Table 4 is supplied to the halftone processing circuit 119, and moreover the area discrimination signal RMS is supplied from the space filtering circuit 116 to the halftone processing circuit 119.

For the "recopying mode" in the image processing modes, the original which is reproduced by copying is used. Generally, when the original is reproduced by copying, the lines tend to become bolder than in the original due to the characteristics of electronic photography. When a copied original is recopied and the recopied original is further recopied, and thus recopying of the original is repeated, the lines become bolder to deteriorate the image quality. To prevent such a tendency to bolder lines, a halftone-processed image is further processed to obtain thinner lines according to the algorithm shown in FIG. 22.

According to the above-described embodiments, the effects of the present invention described below are obtained and, in addition, the following effects can be obtained in which a copying image with excellent reproducibility can be obtained from a low contrast original such as a pencil-written original, and in repeated recopying of the original an image free from deterioration of the image quality can be obtained without an increase in the boldness of the lines.

As described above, the image processing apparatus according to the present invention is capable of processing mixed images of characters and photographs while making the resolution of character portions and the halftone of photographs compatible.

In the present invention, an appropriate output of a mixed image can be obtained by selecting an output according to a separation signal.

In the present invention, total processing and separation processing can be changed over and the contents of the processing can be changed.

In the present invention, several kinds of filter intensities can be provided in a simple configuration to ensure flexibility of processing by disconnecting a bit shifting portion which provides a coefficient portion of an intensity filter and a calculation portion for obtaining a total sum of pixels.

In the present invention, several kinds of filter characteristics can be provided in a simple configuration and the applicable rage of processing can be expanded by disconnecting a bit shifting portion which provides a coefficient portion of a smoothing filter and a calculation portion for obtaining a total sum of pixels.

In the present invention, the character portion and the non-character portion can be separated in a simple configuration.

In the present invention, a configuration for separated processing is simple and the costs can be reduced.

In the present invention, the circuit only for delaying the control signal can be provided at lower costs than the circuit for delaying the image data.

In the present invention, a very good image can be obtained from a mixed manuscript document of the character/line image and the photograph/net points image by performing only one-time copying operation for both occasions. Furthermore, the "moire" occurring on the net points manuscript can be suppressed.

In the present invention, a mixed original containing characters and photographs in a default can be satisfactorily copied in a default state without setting a special mode on the operation panel.

In the present invention, the image processing apparatus is applicable to various kinds of requirements for copying diversified types of originals such as general originals including character/photograph-mixed originals, originals mainly containing photographs, faint or low contrast originals which are written or drawn with pencils and recopied originals on which lines are bolder than the original.

Obviously, additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An image process apparatus, comprising:
    space filtering means for receiving image data and including:
        first filter means for filtering the image data as character data;
        second filter means for filtering the image data as photograph data; and
        area separating means for determining whether the image data is character data or photograph data, and for outputting an area signal which controls selecting of an output of the first filter means or the second filter means based on the determination of the image data as character data or photograph data;
    halftone processing means for receiving an output of the space filtering means as an input image signal and for receiving the area signal from the space filtering means, and including:
        multi-values processing means for phase controlling and one-pixel and two-pixel processing the input image signal;
        error spreading processing means for outputting an error of a noticeable pixel in the input image signal;
        multi-values dither processing means for dither processing the input image signal; and
        image signal selection control receiving the area signal and for selecting an output of the multi-values processing means, error spreading processing means, and multi-value dither processing means based on the area signal.

2. The image processing apparatus according to claim 1, wherein the error spreading processing means outputs an error of the noticeable pixel by adding a re-quantized error to the noticeable pixel, re-quantizing a result of the adding, and generating a brightness signal.

3. The image processing apparatus according to claim 1, wherein the halftone processing means further includes a binary processing means for converting pixels in the input image signal to a white value or a black value.

4. The image processing apparatus according to claim 3, wherein the binary processing means includes binary processing with one of fixed threshold values and dither binary processing.

5. An image processing apparatus, comprising:
   a space filter which receives image data and including:
      a first filter which filters the image data as character data;
      a second filter which filters the image data as photograph data; and
      an area separating circuit which determines whether the image data is character data or photograph data, and which outputs an area signal which controls selecting of an output of the first filter or the second filter based on the determination of the image data as character data or photograph data;
   a halftone processor which receives an output of the space filter as an input image signal and which receives the area signal from the space filter, and including:
      a multi-values processor which phase controls and one-pixel and two-pixel processes the input image signal;
      an error spreading processor which outputs an error of a noticeable pixel in the input image signal;
      a multi-values dither processor which dither processes the input image signal; and
      an image signal selection controller which receives the area signal and which selects an output of the multi-values processor, error spreading processor, and multi-value dither processor based on the area signal.

6. The image processing apparatus according to claim 5, wherein the error spreading processor outputs an error of the noticeable pixel by adding a re-quantized error to the noticeable pixel, re-quantizing a result of the adding, and generating a brightness signal.

7. The image processing apparatus according to claim 5, wherein the halftone processor further includes a binary processor which converts pixels in the input image signal to a white value or a black value.

8. The image processing apparatus according to claim 7, wherein the binary processor includes binary processing with one of fixed threshold values and dither binary processing.

9. An image process method, comprising the steps of:
   filtering received image data and including the substeps of:
      first filtering the image data as character data;
      second filtering the image data as photograph data; and
      determining whether the input image data is character data or photograph data, and outputting an area signal which controls selecting of an output of the step of first filtering or second filtering based on the determination of the image data as character data or photograph data;
   halftone processing an output of the filtering step as an input image signal and receiving the area signal, and including the substeps of:
      multi-values processing for phase controlling and one-pixel and two-pixel processing the input image signal;
      error spreading processing for outputting an error of a noticeable pixel in the input image signal;
      multi-values dither processing for dither processing the input image signal; and
      receiving the area signal and selecting an output of the multi-values processing step, error spreading processing step, and multi-value dither processing step based on the area signal.

10. The image processing method according to claim 9, wherein the error spreading step outputs an error of the noticeable pixel by adding a re-quantized error to the noticeable pixel, re-quantizing a result of the adding, and generating a brightness signal.

11. The image processing method according to claim 9, wherein the step of halftone processing further includes a substep of binary processing for converting pixels in the input image signal to a white value or a black value.

12. The image processing method according to claim 11, wherein the binary processing step includes a substep of binary processing with one of fixed threshold values and dither binary processing.

* * * * *